(12) United States Patent
Hattori et al.

(10) Patent No.: US 11,390,112 B2
(45) Date of Patent: Jul. 19, 2022

(54) RESIN DECORATIVE PART AND DIAL PLATE

(71) Applicant: Yazaki Corporation, Tokyo (JP)

(72) Inventors: Tatsuya Hattori, Shizuoka (JP); Teruomi Sano, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 294 days.

(21) Appl. No.: 16/532,078

(22) Filed: Aug. 5, 2019

(65) Prior Publication Data
US 2020/0079142 A1 Mar. 12, 2020

(30) Foreign Application Priority Data

Sep. 7, 2018 (JP) .............................. JP2018-168099

(51) Int. Cl.
*B44F 1/04* (2006.01)
*B44C 5/04* (2006.01)
(Continued)

(52) U.S. Cl.
CPC ............ *B44F 1/045* (2013.01); *B44C 5/0423* (2013.01); *B44C 5/0453* (2013.01); *G01D 13/04* (2013.01);
(Continued)

(58) Field of Classification Search
CPC ......... B32B 3/30; B32B 27/08; B32B 27/365; B32B 2250/05; B32B 2307/414;
(Continued)

(56) References Cited

U.S. PATENT DOCUMENTS 7,443,691 B1 10/2008 Davis
9,739,648 B2 8/2017 Takeda
(Continued)

FOREIGN PATENT DOCUMENTS

JP 2001-113894 A 4/2001
JP 2010-271052 A 12/2010
(Continued)

OTHER PUBLICATIONS

Machine Translation of JP 2017-102016A (Year: 2017).*

*Primary Examiner* — Christopher M Polley
*Assistant Examiner* — Sathavaram I Reddy
(74) *Attorney, Agent, or Firm* — Kenealy Vaidya LLP

(57) ABSTRACT

In a resin decorative part, a carbon decorative panel includes a clear decoration having a body transmitting light and including a carbon-toned irregular surface provided on the body and having a carbon-toned pattern formed with protrusions and depressions. The carbon-toned irregular surface has a plurality of unit patterns that constitute a weave of pseudo carbon fiber bundles presenting carbon fiber bundles in a pseudo manner, as the protrusions and depressions that form the carbon-toned pattern. The unit patterns each have a top portion positioned at the center in the extending direction of the pseudo carbon fiber bundle. A plurality of unit patterns include at least two kinds of unit patterns with different top portion inclinations, where the top portion inclination is the inclination of the long axis along the long side direction of the top portion relative to the reference line along the extending direction.

19 Claims, 16 Drawing Sheets

(51) Int. Cl.
*G01D 13/04* (2006.01)
*B32B 3/30* (2006.01)
*B32B 27/08* (2006.01)
*B32B 27/36* (2006.01)

(52) U.S. Cl.
CPC .......... *B32B 3/30* (2013.01); *B32B 27/08* (2013.01); *B32B 27/365* (2013.01); *B32B 2250/05* (2013.01); *B32B 2307/414* (2013.01); *B32B 2307/416* (2013.01); *B32B 2451/00* (2013.01)

(58) Field of Classification Search
CPC .......... B32B 2307/416; B32B 2451/00; B44C 5/0423; B44C 5/0453; B44F 1/045; G01D 11/28; G01D 13/04
See application file for complete search history.

(56) References Cited

U.S. PATENT DOCUMENTS

| | | | |
|---|---|---|---|
| 10,828,850 | B2 | 11/2020 | Matsumoto et al. |
| 2005/0142430 | A1 | 6/2005 | Yoshida et al. |
| 2012/0028008 | A1 | 2/2012 | Tanaka et al. |
| 2015/0136015 | A1 | 5/2015 | Takeda |
| 2016/0250119 | A1 | 9/2016 | Sutton et al. |
| 2017/0157804 | A1* | 6/2017 | Takemoto ............... B29C 70/48 |
| 2020/0079142 | A1 | 3/2020 | Hattori et al. |
| 2020/0166387 | A1 | 5/2020 | Hattori et al. |

FOREIGN PATENT DOCUMENTS

| | | |
|---|---|---|
| JP | 2015-093423 A | 5/2015 |
| JP | 2015-099084 A | 5/2015 |
| JP | 2017-102016 A | 6/2017 |
| JP | 2018-168098 A | 11/2018 |

* cited by examiner

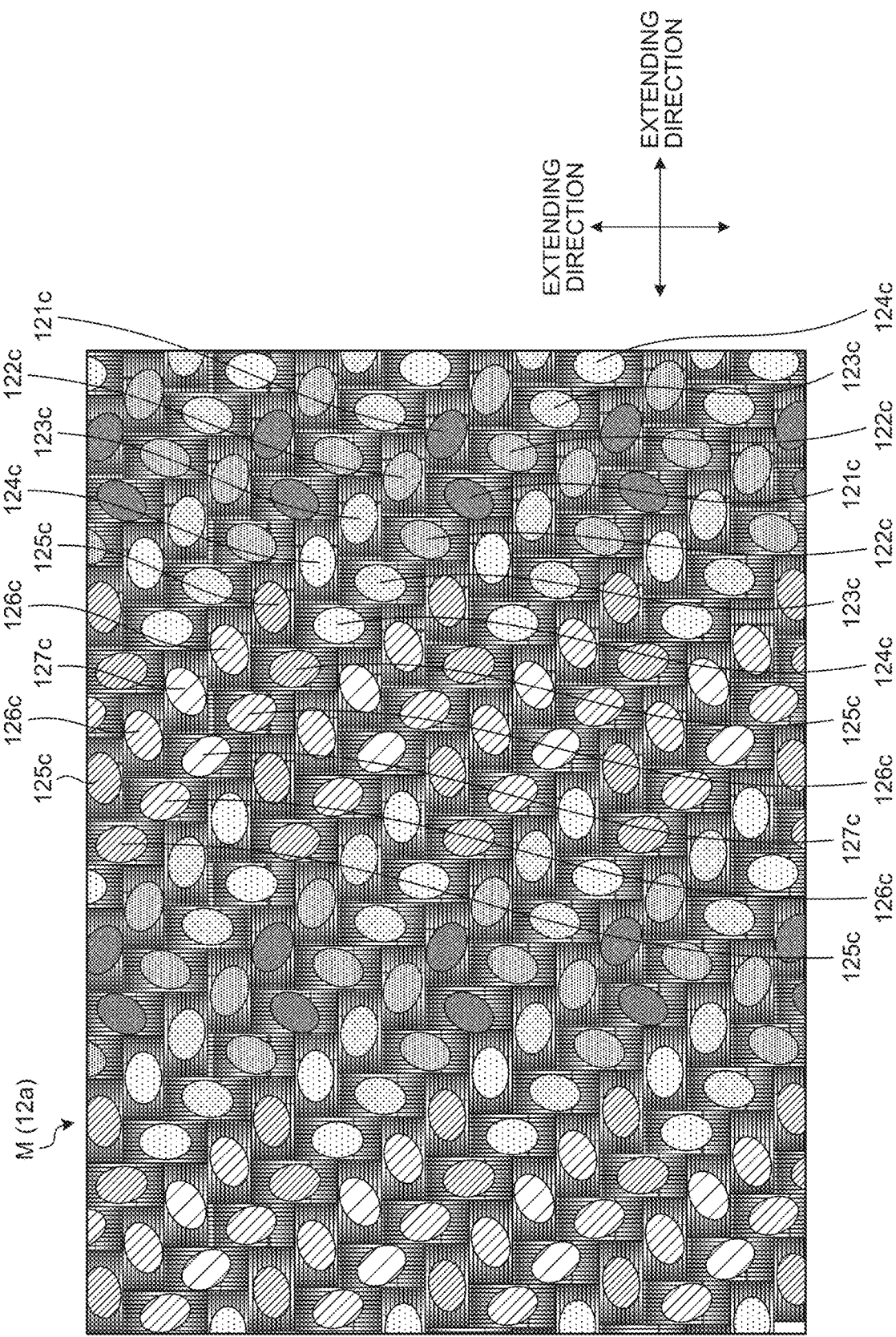

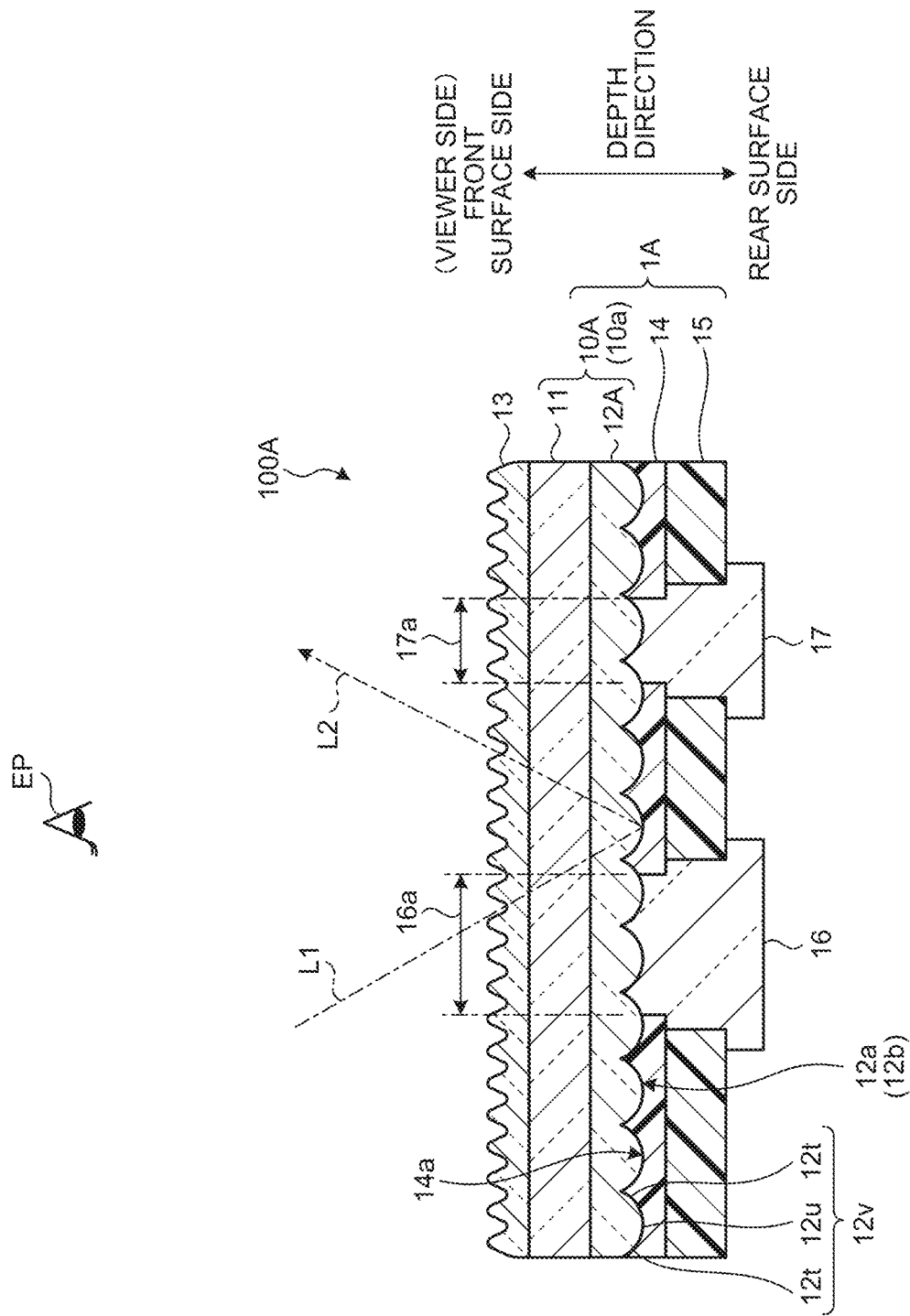

RESIN DECORATIVE PART AND DIAL PLATE

CROSS-REFERENCE TO RELATED APPLICATION(S)

The present application claims priority to and incorporates by reference the entire contents of Japanese Patent Application No. 2018-168099 filed in Japan on Sep. 7, 2018.

BACKGROUND OF THE INVENTION

1. Field of the Invention

The present invention relates to a resin decorative part and a dial plate.

2. Description of the Related Art

Conventionally, Japanese Patent Application Laid-open No. 2017-102016 discloses, as an example of dials, an instrument dial plate that displays a vehicle speed and the like in a visible manner. This instrument dial plate includes a light-transmitting substrate, a clear layer provided on the viewer side of the substrate to present protrusions and depressions of a carbon surface in a pseudo manner, and a print layer provided on the opposite side to the viewer side of the substrate to present a carbon-toned pattern. The instrument dial plate uses a clear layer to present a carbon surface in a pseudo manner and thereby improves the texture of the carbon-toned decoration.

It has been desired, for example, to further improve the texture of the carbon-toned decoration in the instrument dial plate disclosed in Japanese Patent Application Laid-open No. 2017-102016.

SUMMARY OF THE INVENTION

The present invention is then made in view of the foregoing and aims to provide a resin decorative part and a dial plate that can appropriately ensure the texture of the carbon-toned decoration.

In order to solve the above mentioned problem and achieve the object, a resin decorative part according to one aspect of the present invention includes a clear decoration having a body transmitting light, the clear decoration including a carbon-toned irregular surface disposed on the body and having a carbon-toned pattern formed with protrusions and depressions, wherein the carbon-toned irregular surface has a plurality of unit patterns that constitute a weave of pseudo carbon fiber bundles presenting carbon fiber bundles in a pseudo manner, as the protrusions and depressions that form the carbon-toned pattern, and the unit patterns each have a top portion positioned at a center in an extending direction of the pseudo carbon fiber bundle and include at least two kinds of the unit patterns with different top portion inclinations, where the top portion inclination is an inclination of a center line along a long side direction of the top portion relative to a reference line along the extending direction.

According to another aspect of the present invention, in the resin decorative part, it is preferable that the top portion inclination of the top portion varies stepwise in the unit patterns that are adjacent to each other and in which the extending direction of the pseudo carbon fiber bundle is the same direction.

According to still another aspect of the present invention, in the resin decorative part, it is preferable that the carbon-toned pattern is a twill weave pattern in which the extending direction of the pseudo carbon fiber bundle coincides with a long side direction of the unit pattern and the long side direction crosses one another.

According to still another aspect of the present invention, in the resin decorative part, it is preferable that the unit patterns each have a pair of curved portions positioned on both sides of the top portion in the extending direction and formed in a curved shape, and a curvature of the pair of curved portions in a section along the extending direction of the pair of curved portions is greater on a center portion side than on an end portion side in a crossing direction that crosses the extending direction.

According to still another aspect of the present invention, in the resin decorative part, it is preferable that a boundary line of the top portion and the pair of curved portions is an arc-shaped curve protruding from the top portion side toward the curved portion side.

According to still another aspect of the present invention, in the resin decorative part, it is preferable that the resin decorative part includes a carbon color layer colored in a carbon color and reflecting light, wherein the carbon-toned irregular surface is disposed on an opposite side to a viewer side of the body, and the top portions of the unit patterns are formed to be concave from the opposite side to the viewer side toward the viewer side, and the carbon color layer is laminated on the carbon-toned irregular surface and includes a reflective surface in contact with the unit patterns to reflect light transmitted through the clear decoration.

According to still another aspect of the present invention, in the resin decorative part, it is preferable that the resin decorative part includes a colored layer laminated on an opposite side to a viewer side of the body and colored in a carbon color, wherein the carbon-toned irregular surface is disposed on the viewer side of the body, and the top portions of the unit patterns are formed to be convex from the opposite side to the viewer side toward the viewer side, and the clear decoration reflects part of light incident on the carbon-toned irregular surface toward the viewer side and transmit another part of light incident on the carbon-toned irregular surface toward the colored layer side.

In order to achieve the object, a dial plate according to still another aspect of the present invention includes a clear decoration having a body disposed in a vehicle and transmitting light, the clear decoration including a carbon-toned irregular surface disposed on the body and having a carbon-toned pattern formed with protrusions and depressions; a low reflection layer laminated on a viewer side of the body and suppressing reflection or light; and a design display section disposed on the body and transmitting light such that a design related to the vehicle is illuminated, wherein the carbon-toned irregular surface has a plurality of unit patterns that constitute a weave of pseudo carbon fiber bundles presenting carbon fiber bundles in a pseudo manner, as the protrusions and depressions that form the carbon-toned pattern, and the unit patterns each have a top portion positioned at a center in an extending direction of the pseudo carbon fiber bundle and include at least two kinds of the unit patterns with different top portion inclinations, where the top portion inclination is an inclination of a center line along a long side direction of the top portion relative to a reference line along the extending direction.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a plan view illustrating a carbon toned-pattern according to the embodiment;

FIG. 11 is a sectional view illustrating a configuration example of the dial plate according to a first modification of the embodiment;

DETAILED DESCRIPTION OF THE PREFERRED EMBODIMENTS

Modes for carrying out the present invention (embodiments) will be described in detail with reference to the drawings. The present invention is not limited by the description of embodiments below. The components described below include those easily conceived by those skilled in the art and those substantially equivalent. The configurations described below can be combined as appropriate. The configurations are susceptible to a variety of omission, substitution, and modification without departing from the spirit of the invention.

Embodiments

Figure 1:
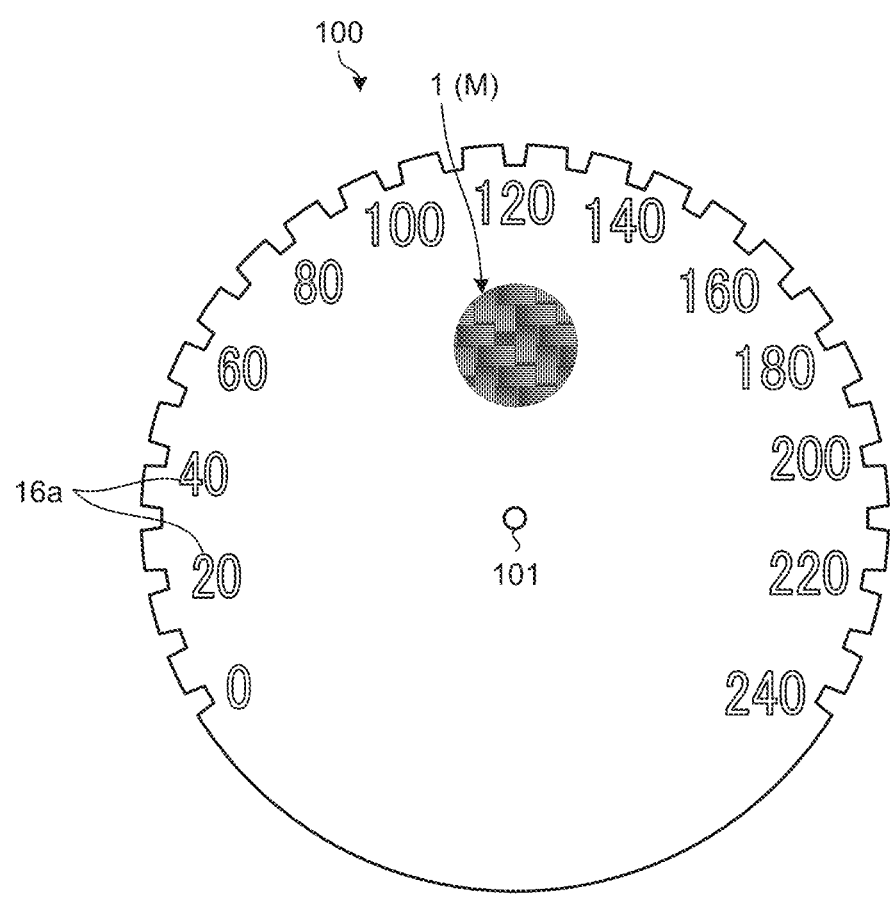
FIG. 1 is a front view illustrating a configuration example of a dial plate according to an embodiment.
Figure 2:
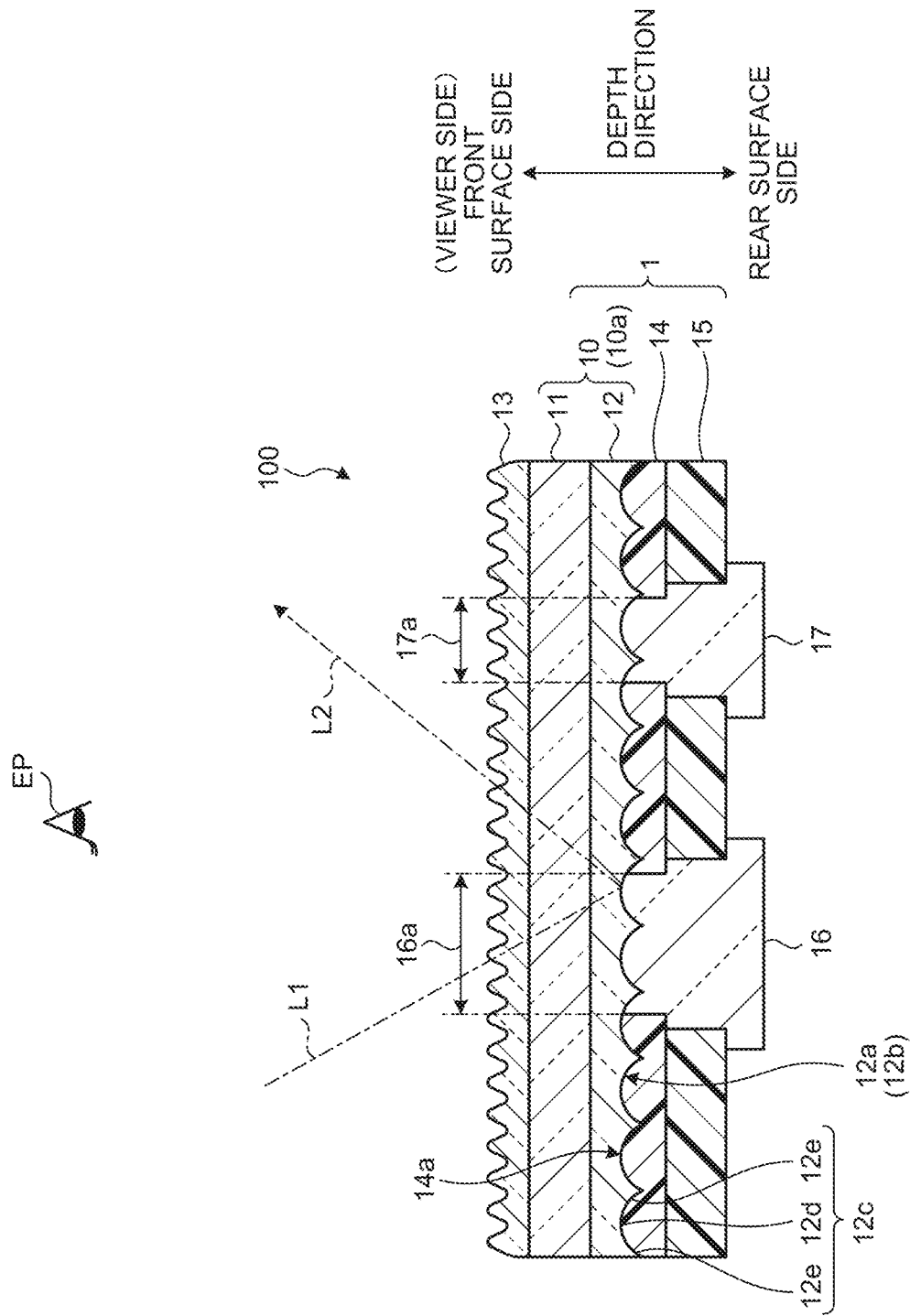
FIG. 2 is a sectional view illustrating a configuration example of the dial plate according to the embodiment.
Figure 3:
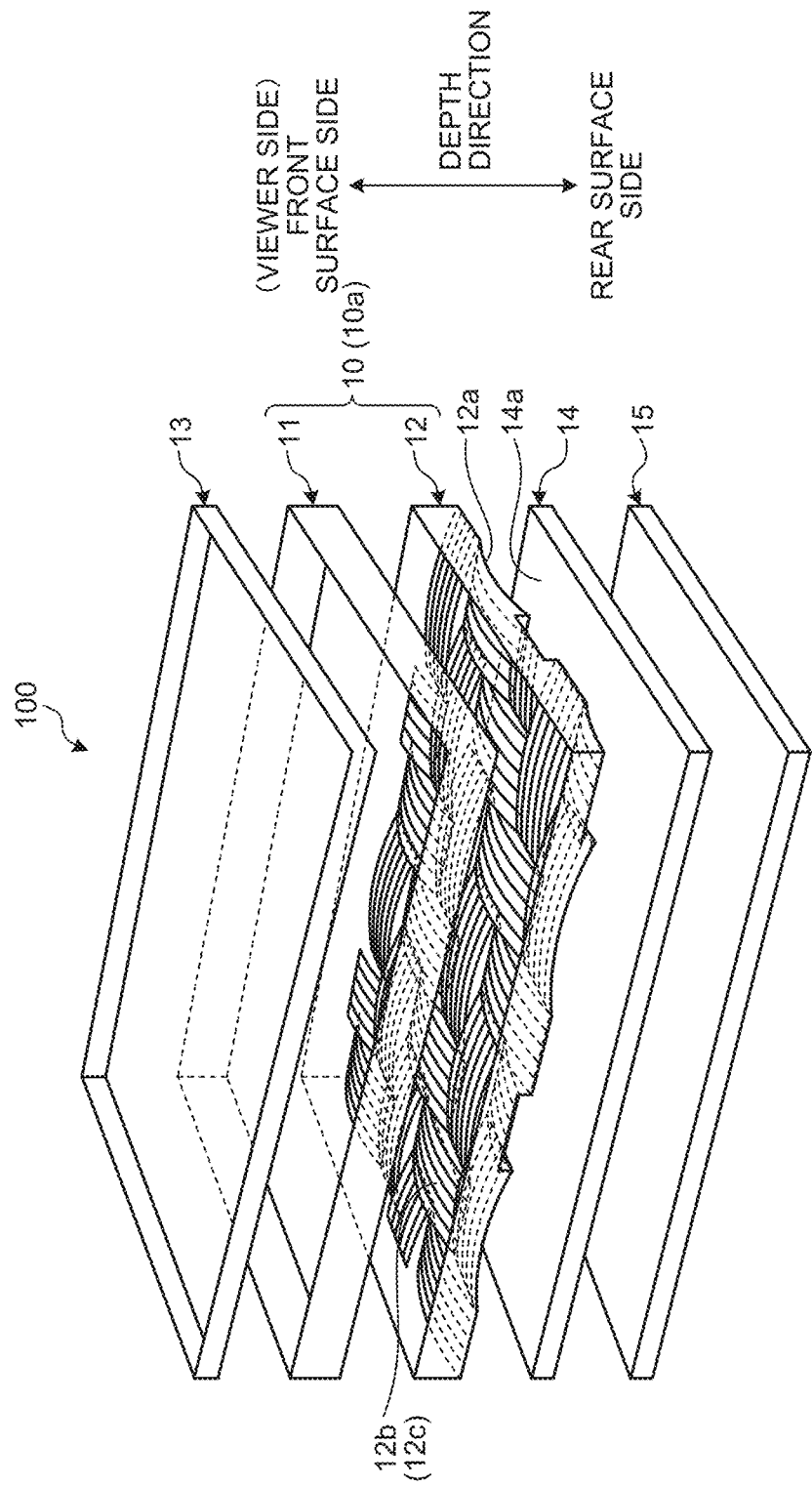
FIG. 3 is an exploded perspective view illustrating a configuration example of the dial plate according to the embodiment.
Figure 4:
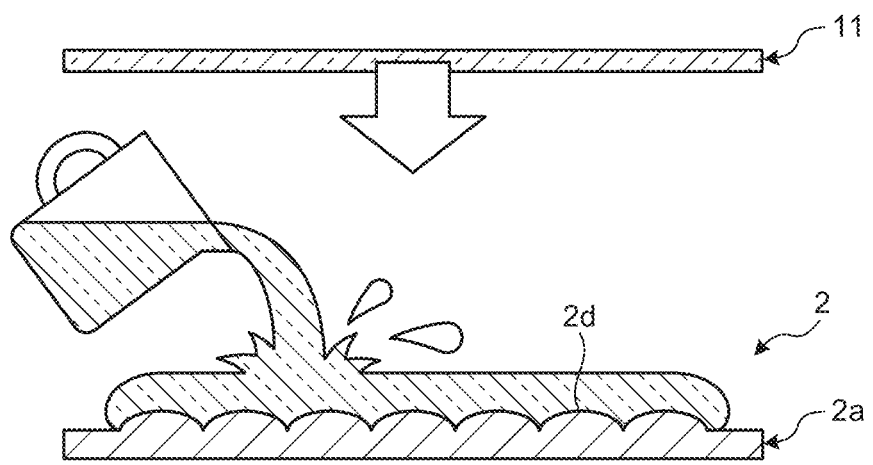
FIG. 4 is a side view illustrating a first step of imprinting in the dial plate according to the embodiment.
Figure 5:
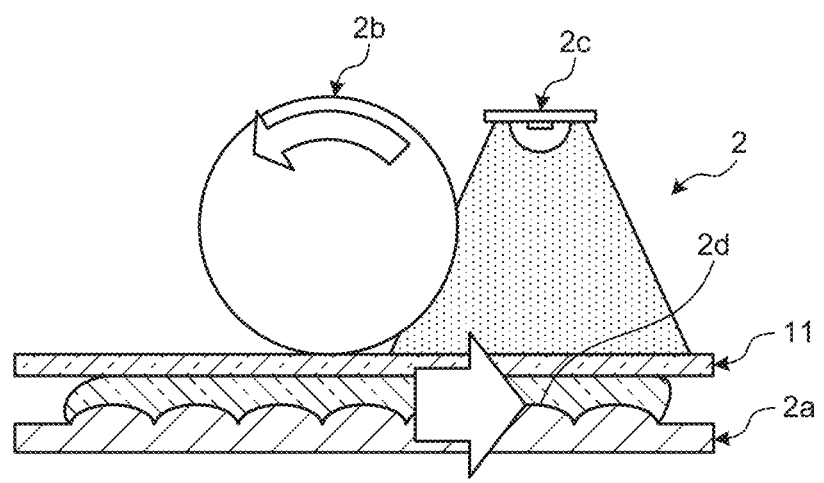
FIG. 5 is a side view illustrating a second step of imprinting in the dial plate according to the embodiment.
Figure 6:
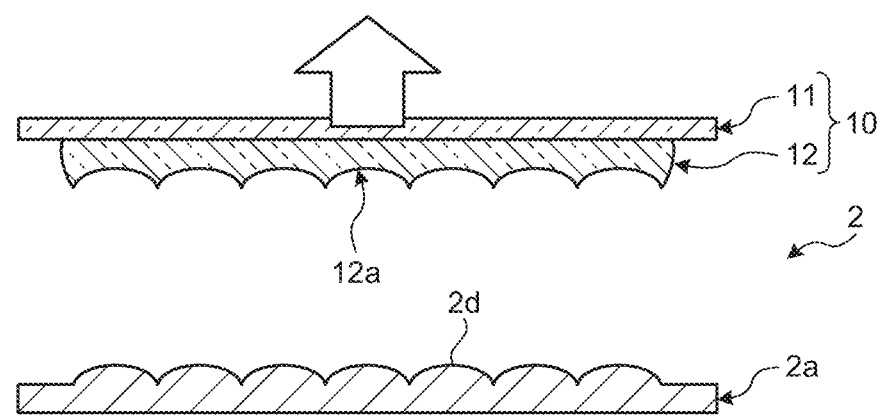
FIG. 6 is a side view illustrating a third step of imprinting in the dial plate according to the embodiment.
Figure 7:
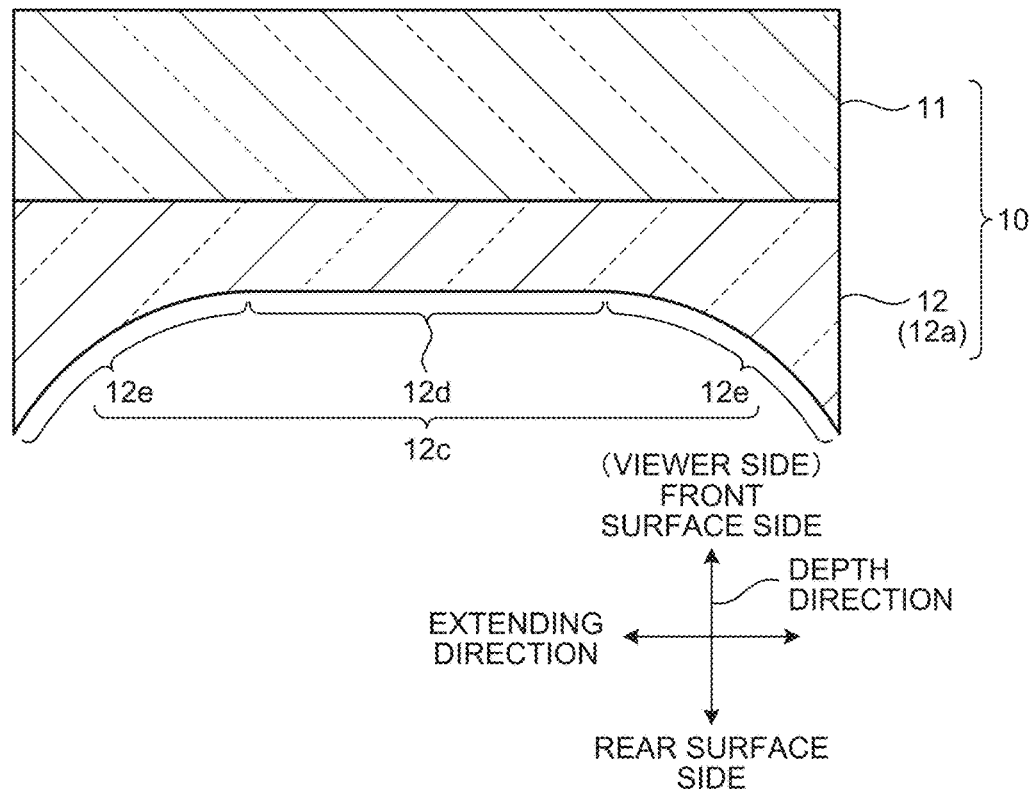
FIG. 7 is a sectional view illustrating a configuration example of a unit pattern according to the embodiment.
Figure 8:
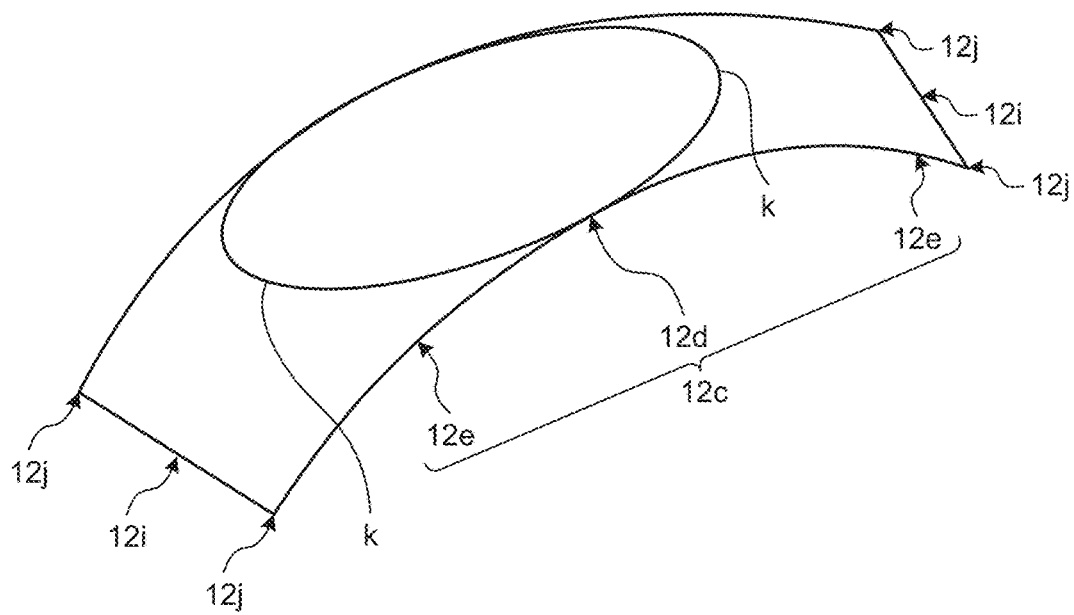
FIG. 8 is a perspective view illustrating a configuration example of the unit pattern according to the embodiment.
Figure 9A:
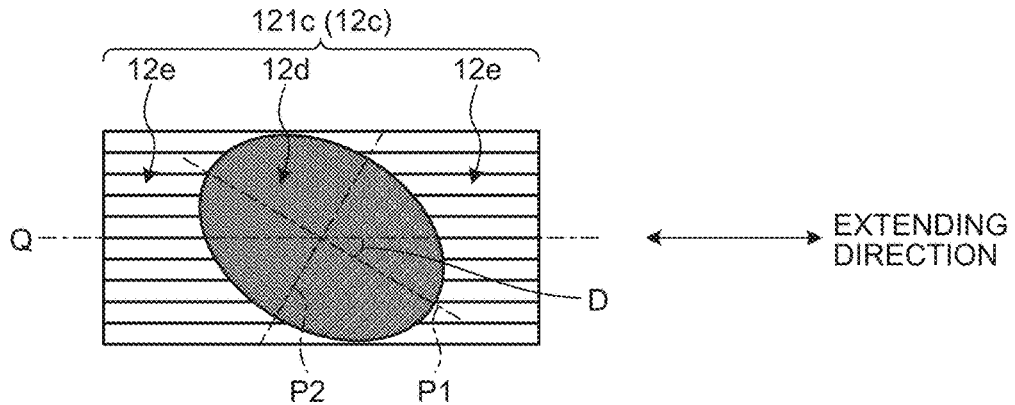
FIG. 9A is a plan view illustrating an example of the top portion inclination of the unit pattern according to the embodiment.
Figure 9B:
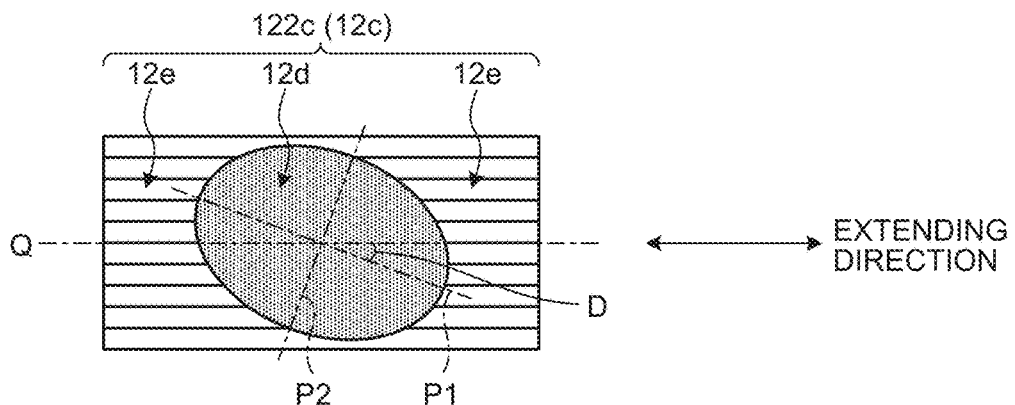
FIG. 9B is a plan view illustrating an example of the top portion inclination of the unit pattern according to the embodiment.
Figure 9C:
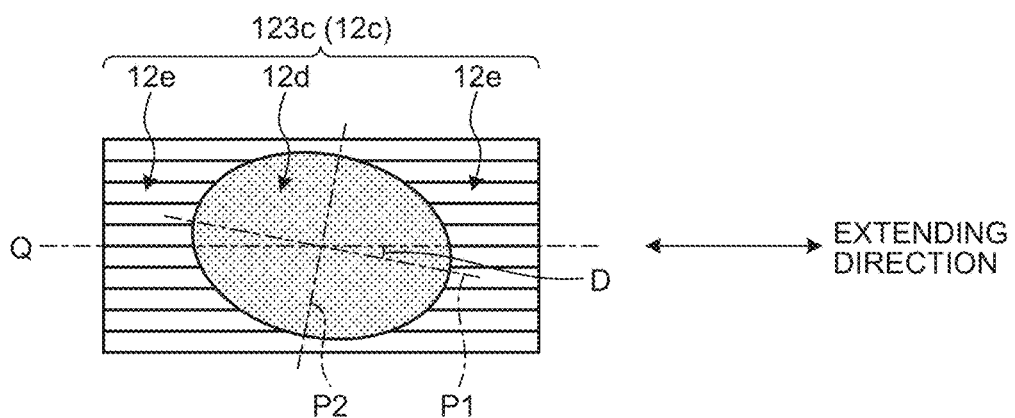
FIG. 9C is a plan view illustrating an example of the top portion inclination of the unit pattern according to the embodiment.
Figure 9D:
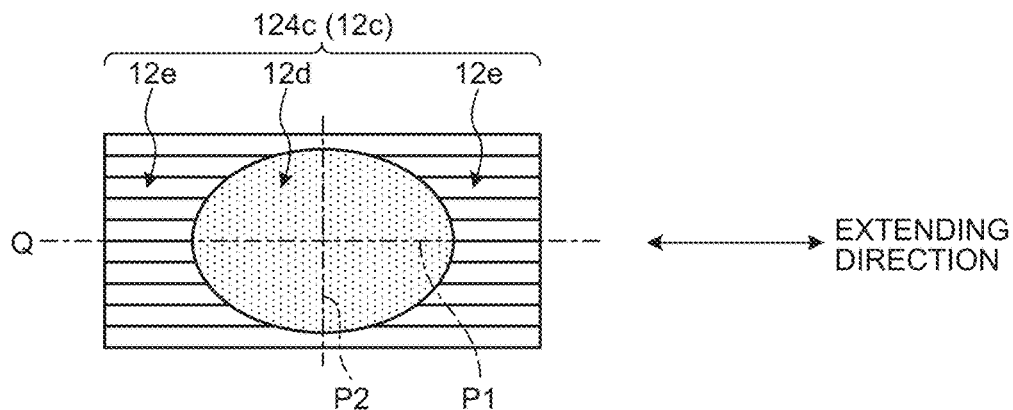
FIG. 9D is a plan view illustrating as example of the top portion inclination of the unit pattern according to the embodiment.
Figure 9E:
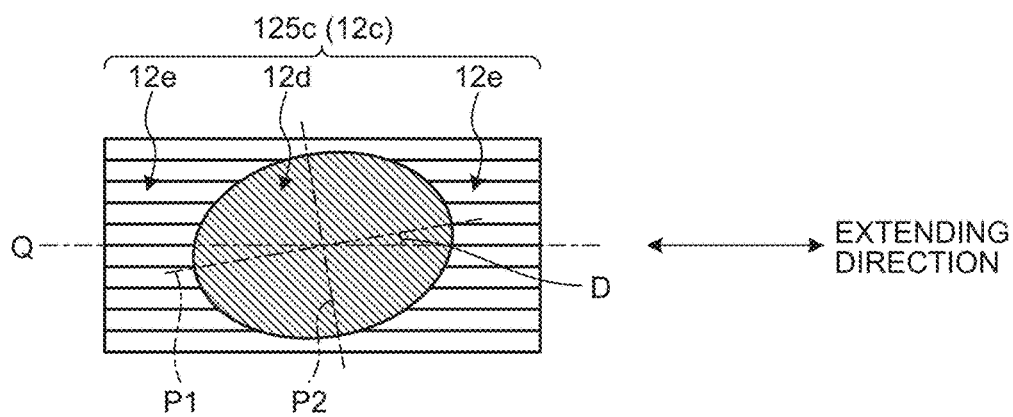
FIG. 9E is a plan view illustrating as example of the top portion inclination of the unit pattern according to the embodiment.
Figure 9F:
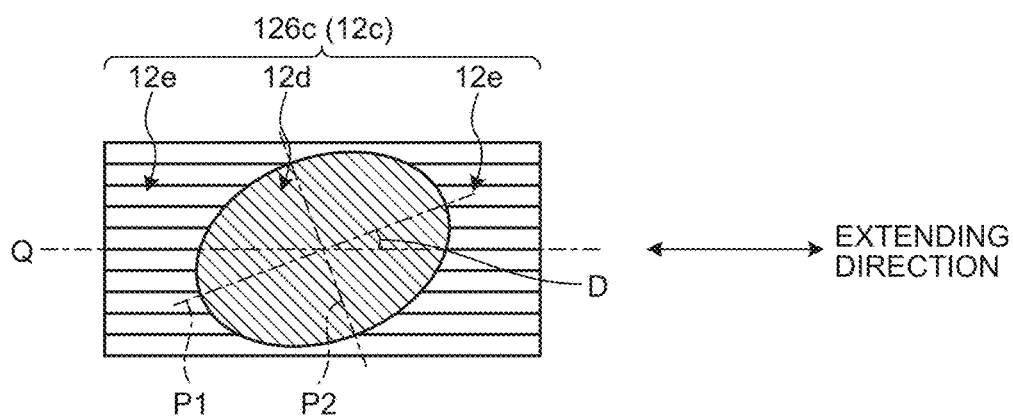
FIG. 9F is a plan view illustrating as example of the top portion inclination of the unit pattern according to the embodiment.
Figure 9G:
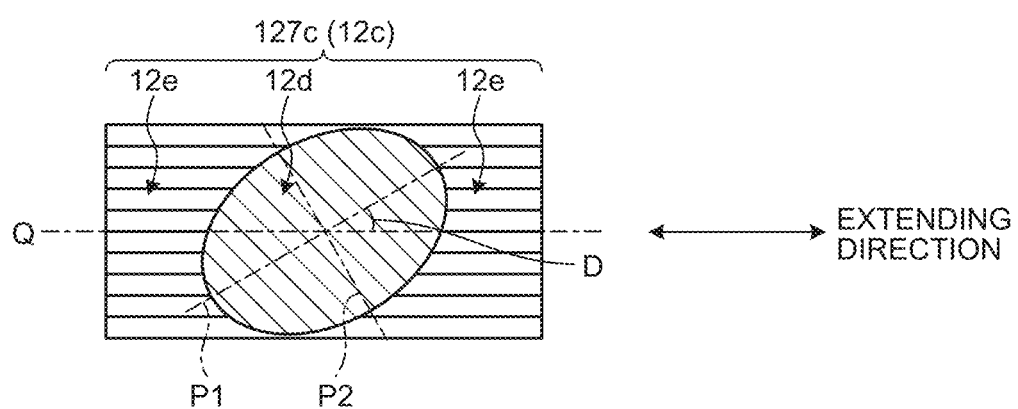
FIG. 9G is a plan view illustrating as example of the top portion inclination of the unit pattern according to the embodiment.

A carbon decorative panel (resin decorative part) 1 and a dial plate 100 according to an embodiment will be described. FIG. 1 is a front view illustrating a configuration example of the dial plate 100 according to an embodiment. FIG. 2 is a sectional view illustrating a configuration example of the dial plate 100 according to the embodiment. FIG. 3 is an exploded perspective view illustrating a configuration example of the dial plate 100 according to the embodiment. FIG. 3 schematically illustrates the features of the layered structure of the dial plate 100. FIG. 4 is a side view illustrating a first step of imprinting in the dial plate 100 according to the embodiment. FIG. 5 is a side view illustrating a second step of imprinting in the dial plate 100 according to the embodiment. FIG. 6 is a side view illustrating a third step of imprinting in the dial plate 100 according to the embodiment. FIG. 7 is a sectional view illustrating a configuration example of a unit pattern 12c according to the embodiment. FIG. 8 is a perspective view illustrating a configuration example of the unit pattern 12c according to the embodiment. FIGS. 9A to 9G are plan views illustrating an example of a top portion inclination D of the unit pattern 12c according to the embodiment. FIG. 10 is a plan view illustrating a carbon-toned pattern M according to the embodiment.

As illustrated in FIG. 1, the carbon decorative panel 1 is applied to the dial plate 100 as a resin decorative part having a carbon-toned pattern M. The dial plate 100 is applied to a vehicle indicator (not illustrated) mounted on a vehicle. The vehicle indicator constitutes a vehicle-mounted meter and, for example, is mounted on an instrument panel provided in the dashboard of a vehicle to display a variety of information related to the vehicle as information available for driving the vehicle.

The dial plate 100 is, for example, a dial plate for a speedometer and formed as a circular flat plate. The dial plate 100 has a through hole 101 at the center, in which a not-illustrated pointer is inserted. The dial plate 100 has a plurality of character display sections (design display sections) 16a in the circumferential direction near the outer periphery to show the speed. For example, each character display section 16a emits light radiating from a light source (not illustrated) arranged in the dial plate 100 on the opposite side to the viewer side viewed by the driver, to the viewer side. The driver then can recognize a character in the character display section 16a that shows the vehicle speed in the dial plate 100. Although FIG. 1 partially illustrates the carbon-toned pattern M, the carbon-toned pattern M is provided, for example, in a region excluding the regions of the character display sections 16a.

As used herein the depth direction of the dial plate 100 typically corresponds to the front-back direction of the vehicle to which the dial plate 100 is applied. The front surface side of the dial plate 100 is the side facing the driver's seat of the vehicle and typically the viewer side viewed by the driver sitting in the driver's seat, that is, the driver's eyepoint EP side. By contrast, the rear surface side of the dial plate 100 is the opposite side to the front surface side in the depth direction and typically the side accommodated in the inside of the instrument panel.

As illustrated in FIG. 2, the dial plate 100 includes a carbon decorative panel 1, an anti-glare (AG) print layer 13 as a low reflection layer, a design layer 16, and a smoke layer 17. The carbon decorative panel 1 includes a clear decoration 10, a carbon color layer 14, and a light-blocking print layer 15. As illustrated in FIG. 3, in the dial plate 100, the AG print layer 13, the clear decoration 10, the carbon color layer 14, and the light-blocking print layer 15 are layered in this order from the front surface side to the rear surface side in the depth direction.

The clear decoration 10 has a body 10a that transmits light of wavelengths in the visible light range. The body 10a includes a substrate 11 and a clear layer 12. The substrate 11 serves as the base of the dial plate 100. The substrate 11 is formed of, for example, a resin material such as acrylic resin and polycarbonate that transmits light of wavelengths in the visible light range. The substrate 11 is formed by shaping a resin material into a desired flat plate shape, for example, using a mold.

The clear layer 12 has a carbon-toned pattern M. The clear layer 12 is provided by imprinting described later on the opposite side to the viewer side of the substrate 11, that is, on the rear surface side of the substrate 11. The clear layer 12 is formed of, for example, a photocurable resin material (ink) that transmits light of wavelengths in the visible light range and is cured when irradiated with ultraviolet (UV) rays. As illustrated in FIG. 2, the clear layer 12 includes a carbon-toned irregular surface 12a. The carbon-toned irregular surface 12a is provided on the clear layer 12 on the opposite side to the substrate 11, and a plurality of projections and depressions 12b form the carbon-toned pattern M. The protrusions and depressions 12b constitute a plurality of unit patterns 12c. Each unit pattern 12c constitutes a weave of pseudo carbon fiber bundles presenting actual pre-impregnated carbon fiber bundles in a pseudo manner, in which each individual pseudo carbon fiber presenting an actual carbon fiber in a pseudo manner is formed. As used herein pre-impregnation refers to the woven actual carbon fibers impregnated with resin and cured. The unit pattern 12c has a top portion 12d and a pair of curved portions 12e. The top portion 12d is positioned at the center of the unit, pattern 12c in the extending direction of a pseudo carbon fiber bundle. A pair of curved portions 12e are positioned on both sides of the top portion 12d in the extending direction of a pseudo carbon fiber bundle and are formed in a curved shape. The top portion 12d of the unit pattern 12c is formed in a concave shape from the opposite side to the viewer side toward the viewer side.

The AG print layer 13 suppresses reflection of light. The AG print layer 13 is laminated on the viewer side of the substrate 11 and provided over the entire surface of the substrate 11. The AG print layer 13 is formed, for example, by screen printing on the viewer side of the substrate 11. The AG print layer 13 has minute protrusions and depressions on the viewer side of the substrate 11. The AG print layer 13 diffuses incident light L1 incident from the viewer side on the minute protrusions and depressions to suppress regular reflection of incident light L1 on the surface of the substrate 11 on the viewer side.

The carbon color layer 14 is a colored layer colored in a carbon color. As used herein carbon color is, for example, black (carbon black). The carbon color layer 14 is laminated on the clear layer 12 on the carbon-toned irregular surface 12a side. The carbon color layer 14 is formed, for example, by printing ink of a resin material on the carbon-toned irregular surface 12a. The carbon color layer 14 is formed, for example, by screen printing. For example, a screen printer prints ink colored in the carbon color on the carbon-toned irregular surface 12a. The screen printer prints ink, for example, in the region excluding the region of the character display section 16a and the region of an indicator display section (design display section) 17a on the carbon-toned irregular surface 12a. The carbon-toned pattern M thus does not appear in the region of the character display section 16a and the region of the indicator display section 17a.

The carbon color layer 14 includes a base material of a resin material colored in the carbon color and a bright material added to the base material and does not transmit light. The bright material has a refractive index different from that of the resin material of the clear layer 12 and has a gloss. The bright material includes, for example, aluminum, silver, or pearl. The carbon color layer 14 has a reflective surface 14a on the carbon-toned irregular surface 12a side. The reflective surface 14a is provided in contact with the protrusions and depressions 12b of the carbon-toned irregular surface 12a and has the shape of the carbon-toned irregular surface 12a. That is, the reflective surface 14a has the same shape as the shape of each unit pattern 12c of the carbon-toned irregular surface 12a. Specifically, a portion of the reflective surface 14a that is in contact with the top portion 12d of the unit pattern 12c is formed in a concave shape from the opposite side to the viewer side toward the viewer side as viewed from the viewer (eyepoint EP) side. In this way, in the reflective surface 14a, a weave of pseudo carbon fiber bundles is formed as viewed from the viewer (eyepoint EP) side, and each individual pseudo carbon fiber is formed. The reflective surface 14a reflects incident light L1 transmitted through the clear decoration 10 toward the viewer side as reflected light 12.

The light-blocking print layer 15 is a light-blocking layer that blocks light. The light-blocking print layer 15 is laminated on the carbon color layer 14 on the opposite side to the viewer side. The light-blocking print layer 15 is formed, for example, by printing ink of a resin material on the carbon color layer 14. The light-blocking print layer 15 is formed, for example, using a screen printer. The screen printer prints ink colored in a light-blocking color on the rear surface side of the carbon color layer 14. The screen printer prints ink on the rear surface side of the carbon color layer 14, for example, in a region excluding the region of the character display section 16a and the region of the indicator display section 17a. The light-blocking print layer 15 blocks light incident from the opposite side (rear surface side) to the viewer side.

The design layer 16 forms the character display section 16a. The character display section 16a transmits light such that a design related to the vehicle is illuminated. The design layer 16 is laminated on the carbon-toned irregular surface 12a side of the clear layer 12. The design layer 16 is formed, for example, by printing ink of a resin material in the region of the character display section 16a in the clear layer 12. The design layer 16 is formed, for example, using a screen printer. The screen printer prints translucent ink colored in a desired color in the region of the character display section 16a in the clear layer 12. The design layer 16 transmits light emitted from a light source (not illustrated) provided on the opposite side (rear surface side) to the viewer side and emits the transmitted light to the clear layer 12. The character display section 16a shows a vehicle speed in the dial plate 100 in a display manner in which the carbon-toned pattern M is not superimposed.

The smoke layer 17 forms the indicator display section 17a. The indicator display section 17a transmits light such that a design related to the vehicle is illuminated. The smoke layer 17 is laminated on the carbon-toned irregular surface 12a side of the clear layer 12. The smoke layer 17 is formed, for example, by printing ink of a resin material in the region of the indicator display section 17a in the clear layer 12. The smoke layer 17 is formed, for example, using a screen printer. The screen printer prints ink colored in a light-reducing color in the region of the indicator display section 17a in the clear layer 12. The smoke layer 17 transmits light emitted from a light source (not illustrated) provided on the opposite side (rear surface side) to the viewer side and emits the transmitted light to the clear layer 12. The indicator display section 17a shows an indicator on the dial plate 100 in a display manner in which the carbon-toned pattern M is not superimposed.

Referring now to FIG. 4 to FIG. 6, the steps of imprinting in the dial plate 100 are described. The operator performs imprinting using an imprinting system 2. The imprinting system 2 includes a mold 2a, a roller 2b, and a UV metal-halide lamp 2c. The mold 2a has a plurality of protrusions and depressions 2d on its surface for forming the unit patterns 12c of the carbon-toned pattern M. As illustrated in FIG. 4, the operator first pours a liquid photocurable resin material (ink) onto the surface of the mold 2a with the protrusions and depressions 2d. As illustrated in FIG. 5, the operator then operates the imprinting system 2 to press the substrate 11 against the photocurable resin material poured on the surface of the mold 2a using the roller 2b while irradiating the photocurable resin material with UV light using the UV metal-halide lamp 2c to cure the photocurable resin material. As illustrated in FIG. 6, the operator then operates the imprinting system 2 to move the photocurable resin material (clear layer 12) laminated on the substrate 11 away from the mold 2a. The clear decoration 10 with the carbon-toned irregular surface 12a thus can be formed.

Referring now to FIG. 7 and FIG. 8, the unit pattern 12c will be described in detail. The unit pattern 12c is formed in a rectangular shape when viewed from the viewer side. The unit pattern 12c has the top portion 12d and a pair of curved portions 12e as described above. The unit pattern 12c has the top portion 12d formed to be concave from the opposite side to the viewer side toward the viewer side.

The top portion 12d is formed in an ellipse shape (for example, oval shape) when viewed from the viewer side, and formed to be flat. The top portion 12d is formed, for example, such that the boundary line k of the top portion 12d and a pair of curved portions 12e is formed with an arc-shaped curve protruding from the top portion 12d side toward the curved portion 12e side. The top portion 12d is positioned at the center of the unit pattern 12c in the extending direction of the pseudo carbon fiber bundle, that is, in the long side direction of the unit pattern 12c. The top portion 12d is positioned at the center of the unit pattern 12c in the short side direction orthogonal to the long side direction of the unit pattern 12c. The top portion 12d is formed, for example, over the entire width of the unit pattern 12c in the short side direction.

A pair of curved portions 12e are positioned on both sides of the top portion 12d in the extending direction of the pseudo carbon fiber bundle. The section of a pair of curved portions 12e along the extending direction of a pair of curved portions 12e (that is, the extending direction of the pseudo carbon fiber bundle) is formed in a curved shape (for example, arc shape) protruding from the rear surface side toward the viewer side. The curvature of a pair of curved portions 12e in the section along the extending direction of a pair of curved portions 12e is greater on the center portion 12i side than on the end portion 12j side in the crossing direction that crosses the extending direction. For example, the curvature of a pair of curved portions 12e is largest at the center portion 12i, smaller as the distance from the center portion 12i increases along the crossing direction, and smallest at both end portions 12j, in the crossing direction. With this configuration, the top portion 12d of the unit pattern 12c can be formed in an ellipse shape (for example, oval shape) and the top portion 12d can be formed to be flat.

The carbon-toned pattern M of the carbon-toned irregular surface 12a will now be described in detail. The carbon-toned pattern M presents a twill weave pattern in a pseudo manner. As used herein the twill weave pattern refers to, for example, a weaving method in which a row in the longitudinal direction and a row in the lateral direction of carbon fibers cross every two rows. For example, as illustrated in FIG. 10, the carbon-toned pattern M is formed of unit patterns 12c (121c to 127c) in which the extending direction of each pseudo carbon fiber bundle coincides with the long side direction of the unit pattern 12c (121c to 127c) and the long side direction crosses (is orthogonal to) one another.

The carbon-toned irregular surface 12a may include at least two kinds of unit patterns 12c (121c to 127c) with different inclinations of the top portions 12d. For example, as illustrated in FIG. 9A to FIG. 9G, the carbon-toned irregular surface 12a includes seven kinds of unit patterns 121c to 127c with different top portion inclinations D of the top portions 12d. Here, the top portion inclination D is the inclination of the long axis (center line) P1 relative to the reference line Q. The reference line Q is a line along the extending direction of the pseudo carbon fiber bundle. The long axis P1 as the axis along the long side direction of the top portion 12d.

The top portion inclinations D of the unit patterns 121c to 127c vary stepwise so as to gradually rotate counterclockwise as viewed from the viewer side. For example, the top portion inclinations D of the unit patterns 121c to 127c vary stepwise so as to gradually rotate counterclockwise as viewed from the viewer side in the order of the unit pattern 121c illustrated in FIG. 9A, the unit pattern 122c illustrated in FIG. 9B, the unit pattern 123c illustrated in FIG. 9C, the unit pattern 124c illustrated in FIG. 9D, the unit pattern 125c illustrated in FIG. 9E, the unit pattern 126c illustrated in FIG. 9F, and the unit pattern 127c illustrated in FIG. 9G. The top portions 12d of the unit patterns 121c to 127c may have the same ellipse shape, or the top portions 12d may have different ellipse shapes. That is, in the unit patterns 121c to 127c, the top portion inclinations D of the top portions 12d should be different from each other.

The carbon-toned irregular surface 12a has the appropriately arranged unit patterns 121c to 127c to represent slight changes of carbon fiber bundles produced when actual carbon fiber bundles are woven by pre-impregnation. In the carbon-toned irregular surface 12a, the unit patterns 121c to 127c are arranged such that the top portion inclination D varies stepwise in the unit patterns 121c to 127c that are adjacent to each other and in which the extending direction of the pseudo carbon fiber bundle is the same direction. For example, as illustrated in FIG. 10, in the carbon-toned irregular surface 12a, when the extending direction of the pseudo carbon fiber bundle is the same direction, the unit patterns 121c to 127c are arranged such that the change of the top portion inclination D is smallest in the adjacent unit patterns 121c to 127c in accordance with the rotation direction. In the carbon-toned irregular surface 12a, for example, the unit pattern 125c or the unit pattern 127c is arranged adjacent to the unit pattern 126c.

As described above, the carbon decorative panel 1 according to the embodiment includes the clear decoration 10 having the body 10a transmitting light and including the carbon-toned irregular surface 12a provided on the body 10a and having the carbon-toned pattern M formed with the protrusions and depressions 12b. The carbon-toned irregular surface 12a has the unit patterns 12c that constitute a weave of pseudo carbon fiber bundles presenting carbon fiber bundles in a pseudo manner, as the protrusions and depressions 12b that form the carbon-toned pattern. M. The unit patterns 12c each have the top portion 12d positioned at the center in the extending direction of the pseudo carbon fiber bundle. The unit patterns 12c include at least two kinds of unit patterns 12c with different top portion inclinations D, where the top portion inclination D is the inclination of the long axis P1 along the long side direction of the top portion 12d relative to the reference line Q along the extending direction.

With this configuration, in the carbon decorative panel 1, the top portion inclinations D of the top portions 12d can be formed in various patterns to achieve the resemblance to the top portions of the protrusion and depression shape of an actual carbon member. In the carbon decorative panel 1, therefore, the unit patterns 12c having irregularity that appears as if actual pre-impregnated carbon fiber bundles are woven and pressed can be formed. The carbon decorative panel 1 therefore can achieve change of highlights like an actual carbon member and achieve the appearance that resembles an actual carbon member. The carbon decorative panel 1 therefore can appropriately ensure the texture of the carbon-toned pattern M.

In the above-described carbon decorative panel 1, the top portion inclination D of the top portion 12d varies stepwise in the unit patterns 12c that are adjacent to each other and in which the extending direction of the pseudo carbon fiber bundle is the same direction. With this configuration, the carbon decorative panel 1 can represent a pattern in which actual pre-impregnated carbon fiber bundles continuously change in a pseudo manner and achieve the appearance that resembles an actual carbon member.

In the above-described carbon decorative panel 1, the carbon-toned pattern M is a twill weave pattern including the unit patterns 12c in which the extending direction of the pseudo carbon fiber bundle coincides with the long side direction of the unit pattern 12c and the long side direction crosses one another. With this configuration, the carbon decorative panel 1 can achieve the appearance that resembles an actual carbon member in a twill weave pattern.

In the above-described carbon decorative panel 1, the unit patterns 12c each have a pair of curved portions 12e positioned on both sides of the top portion 12d in the extending direction and formed in a curved shape. The curvature of a pair of curved portions 12e in the section along the extending direction of a pair of curved portions 12e is greater on the center portion 12i side than on the end portion 12j side in the crossing direction that crosses the extending direction. With this configuration, in the carbon decorative panel 1, when viewed from the viewer side, the top portion 12d of the unit pattern 12c can be formed in an ellipse shape (for example, oval shape), and the top portion 12d can be formed to be flat. With this configuration, the carbon decorative panel 1 can achieve the appearance that resembles an actual carbon member.

In the above-described carbon decorative panel 1, the boundary line k of the top portion 12d and a pair of curved portions 12e is an arc-shaped curve protruding from the top portion 12d side toward the curved portion 12e side. With this configuration, in the carbon decorative panel 1, the top portion 12d of the unit pattern 12c can be formed in an ellipse shape (for example, oval shape) when viewed from the viewer side, and the appearance that resembles an actual carbon member can be achieved.

The above-described carbon decorative panel 1 includes the carbon color layer 14 colored in the carbon color and reflecting light. The carbon-toned irregular surface 12a is provided on the opposite side to the viewer side of the body 10a, and the top portions 12d of the unit patterns 12c are formed to be concave from the opposite side to the viewer side toward the viewer side. The carbon color layer 14 is laminated on the carbon-toned irregular surface 12a and includes the reflective surface 14a provided in contact with the unit patterns 12c to reflect light transmitted through the clear decoration 10. With this configuration, the carbon decorative panel 1 can represent the carbon-toned pattern M by reflected light L2 reflected by the reflective surface 14a of the carbon color layer 14 that presents actual pre-impregnated carbon fiber bundles in a pseudo manner. With this configuration, the carbon decorative panel 1 can represent reflected light reflected by the reflective surface of actual pre-impregnated carbon fiber bundles in a pseudo manner. With this configuration, the carbon decorative panel 1 can achieve the appearance that resembles an actual pre-impregnated carbon member. The carbon decorative panel 1 therefore can appropriately ensure the texture of the carbon-toned pattern M.

The dial plate 100 according to an embodiment includes a clear decoration 10, an AG print layer 13, a character display section 16a (design layer 16), and an indicator display section 17a (smoke layer 17). The clear decoration 10 has a body 10a provided in a vehicle and transmitting light and includes a carbon-toned irregular surface 12a provided on the body 10a and having a carbon-toned pattern M formed with the protrusions and depressions 12b. The AG print layer 13 is laminated on the viewer side of the body 10a and suppresses reflection of light. The character display section 16a and the indicator display section 17a are provided on the body 10a and transmit light such that a design related to the vehicle is illuminated. The carbon-toned irregular surface 12a has the unit patterns 12c that constitute a weave of pseudo carbon fiber bundles presenting carbon fiber bundles in a pseudo manner, as the protrusions and depressions 12b that form the carbon-toned pattern M. The patterns 12c each have the top portion 12d positioned at the center in the extending direction of the pseudo carbon fiber bundle and include at least two kinds of unit patterns 12c with different top portion inclinations D, where the top portion inclination D is the inclination of the long axis P1 along the long side direction of the top portion 12d relative to the reference line Q along the extending direction. With this configuration, the dial plate 100 can achieve the effects equivalent to those of the above-described carbon decorative panel 1.

Modifications

Figure 12:
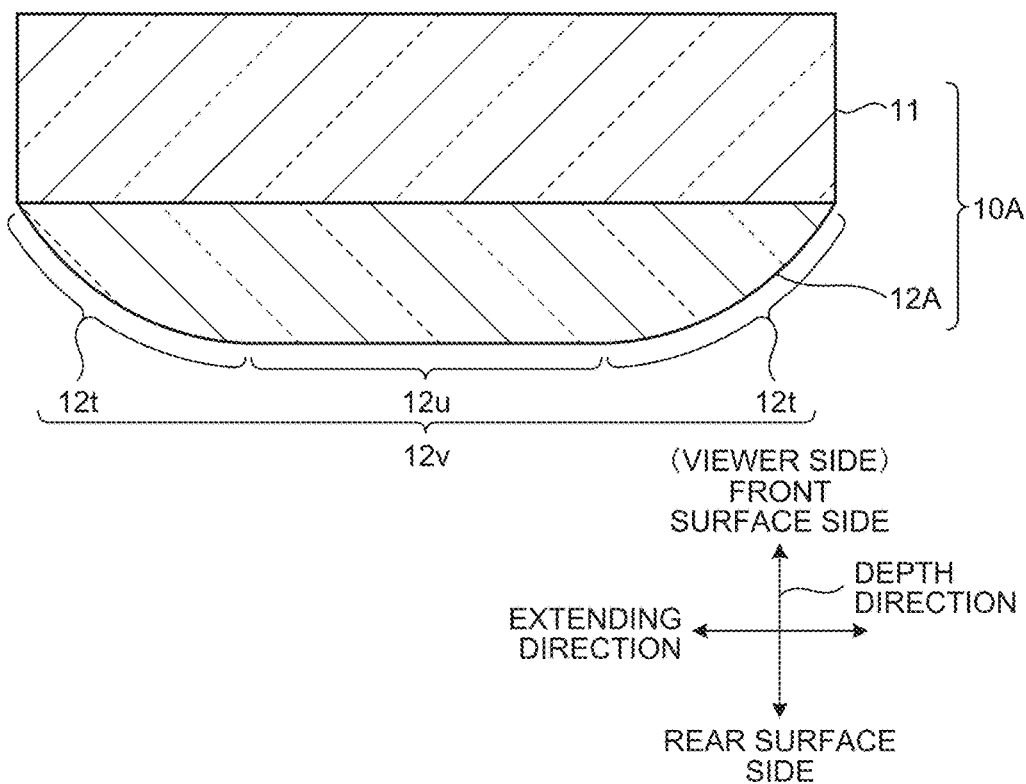
FIG. 12 is a sectional view illustrating a configuration example of the unit pattern according to the first modification of the embodiment.
Figure 13:
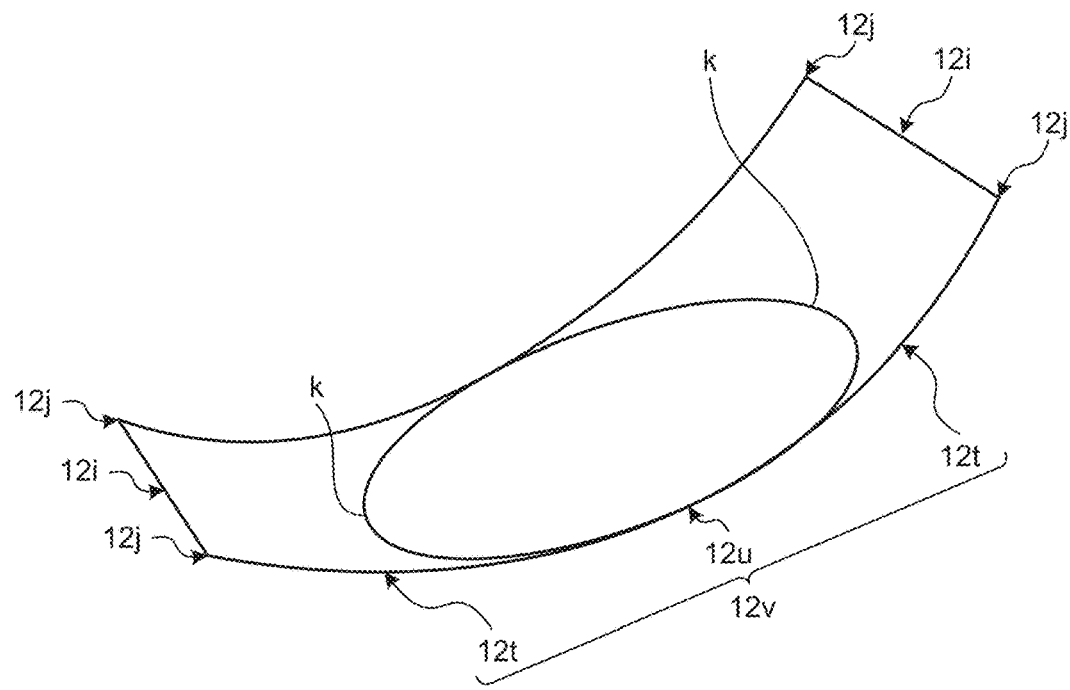
FIG. 13 is a perspective view illustrating a configuration example of the unit pattern according to the first modification of the embodiment.

Modifications of the embodiment will now be described FIG. 11 is a sectional view illustrating a configuration example of a dial plate 100A according to a first modification of the embodiment. FIG. 12 is a sectional view illustrating a configuration example of a unit pattern 12v according to the first modification of the embodiment. FIG. 13 is a perspective view illustrating a configuration example of the unit pattern 12v according to the first modification of the embodiment. As illustrated in FIG. 11, a carbon decorative panel 1A according to the first modification differs from the carbon decorative panel 1 according to the embodiment in that the carbon-toned irregular surface 12a of the clear layer 12A is formed to be convex from the viewer side toward the opposite side to the viewer side. In the carbon decorative panel 1A according to the first modification, the components equivalent to those in the carbon decorative panel 1 according to the embodiment are denoted by the same reference signs and a detailed description thereof is omitted.

The carbon decorative panel 1A includes a clear decoration 10A, a carbon color layer 14, and a light-blocking print layer 15. The clear decoration 10A has a substrate 11 and a clear layer 12A.

The clear layer 12A has a carbon-toned pattern M. The clear layer 12A is provided on the rear surface side of the substrate 11 by imprinting. For example, the clear layer 12A is formed of a photocurable resin material (ink) that transmits light of wavelengths in the visible light range and is cured when irradiated with UV light. The clear layer 12A includes a carbon-toned irregular surface 12a. The carbon-toned irregular surface 12a is provided on the clear layer 12A on the opposite side to the substrate 11 and has the carbon-toned pattern M formed with a plurality of protrusions and depressions. The protrusions and depressions form a plurality of unit patterns 12v. Each unit pattern 12v constitutes a weave of pseudo carbon fiber bundles presenting actual pre-impregnated carbon fiber bundles in a pseudo manner, in which each individual pseudo carbon fiber presenting an actual carbon fiber in a pseudo manner is formed. As illustrated in FIG. 12 and FIG. 13, the unit pattern 12v has a top portion 12u and a pair of curved portions 12t. The top portion 12u of the unit pattern 12v is formed to be convex from the viewer side toward the opposite side to the viewer side.

The top portion 12u is formed in an ellipse shape (for example, oval shape) when viewed from the viewer side, and formed to be flat. The top portion 12u is formed, for example, such that the boundary line k of the top portion 12u and a pair of curved portions 12t is formed with an arc-shaped curve protruding from the top portion 12u side toward the curved portion 12t side. The top portion 12u is positioned at the center of the unit pattern 12v in the extending direction of the pseudo carbon fiber bundle, that is, in the long side direction of the unit pattern 12v. The top portion 12u is positioned at the center of the unit pattern 12v in the short side direction orthogonal to the long side direction of the unit pattern 12v. The top portion 12u is formed, for example, over the entire width of the unit pattern 12v in the short side direction.

A pair of curved portions 12t are positioned on both sides of the top portion 12u in the extending direction of the pseudo carbon fiber bundle. The section of a pair of curved portions 12t along the extending direction of a pair of curved portions 12t (that is, the extending direction of the pseudo carbon fiber bundle) is formed in a curved shape (for example, arc shape) protruding from the viewer side toward the rear surface side. The curvature of a pair of curved portions 12t in the section along the extending direction of a pair of curved portions 12t is greater on the center portion 12i side than on the end portion 12j side in the crossing direction that crosses the extending direction. For example, the curvature of a pair of curved portions 12t is largest at the center portion 12i, smaller as the distance from the center portion 12i increases along the crossing direction, and smallest at both end portions 12j, in the crossing direction. With this configuration, the top portion 12u of the unit pattern 12v can be formed in an ellipse shape (for example, oval shape) and the top portion 12u can be formed to be flat.

The carbon-toned irregular surface 12a includes at least two kinds of unit patterns 12v with different inclinations of the top portions 12u. The carbon-toned irregular surface 12a may include, for example, seven kinds of unit patterns 12v with different top portion inclinations D of the top portions 12u. In this case, the top portion inclination D of the top portion 12u varies stepwise in the unit patterns 12v that are adjacent to each other and in which the extending direction of the pseudo carbon fiber bundle is the same direction. The reflective surface 14a between the clear decoration 10A and the carbon color layer 14 reflects incident light L1 transmitted through the clear decoration 10A toward the viewer side as reflected light 12.

As described above, the carbon decorative panel 1A according to the modification of the embodiment includes the clear decoration 10A having the body 10a transmitting light and including the carbon-toned irregular surface 12a provided on the body 10a and having the carbon-toned pattern M formed with the protrusions and depressions 12b. The carbon-toned irregular surface 12a has the unit patterns 12v that constitute a weave of pseudo carbon fiber bundles presenting carbon fiber bundles in a pseudo manner, as the protrusions and depressions 12b that form the carbon-toned pattern M. The unit patterns 12v each have the top portion 12u positioned at the center in the extending direction of the pseudo carbon fiber bundle. The unit patterns 12v include at least two kinds of unit patterns 12v with different top portion inclinations D, where the top portion inclination D is the inclination of the above-noted long axis P1 along the long side direction of the top portion 12u relative to the reference line Q along the extending direction.

With this configuration, in the carbon decorative panel 1A, the top portion inclinations D of the top portions 12u can be formed in various patterns to achieve the resemblance to the top portions of the projection and depression shape of an actual carbon member. In the carbon decorative panel 1A, therefore, the unit patterns 12v having irregularity that appears as if actual pre-impregnated carbon fiber bundles are woven and pressed can be formed. The carbon decorative panel 1A therefore can achieve change of highlights like an actual carbon member and achieve the appearance that resembles an actual carbon member. The carbon decorative panel 1A therefore can appropriately ensure the texture of the carbon-toned pattern M.

Figure 14:
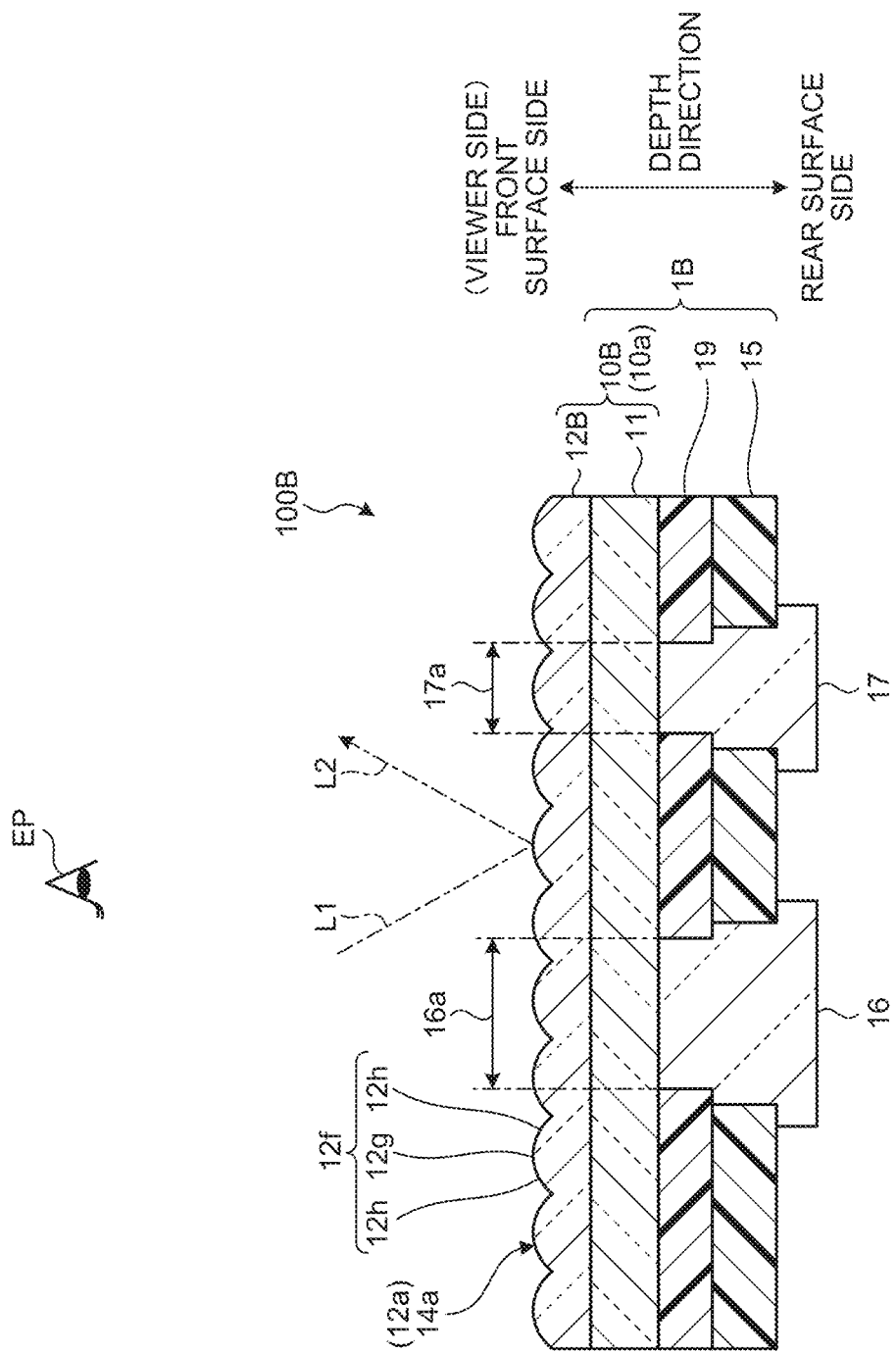
FIG. 14 is a sectional view illustrating a configuration example of the dial plate according to a second modification of the embodiment.
Figure 15:
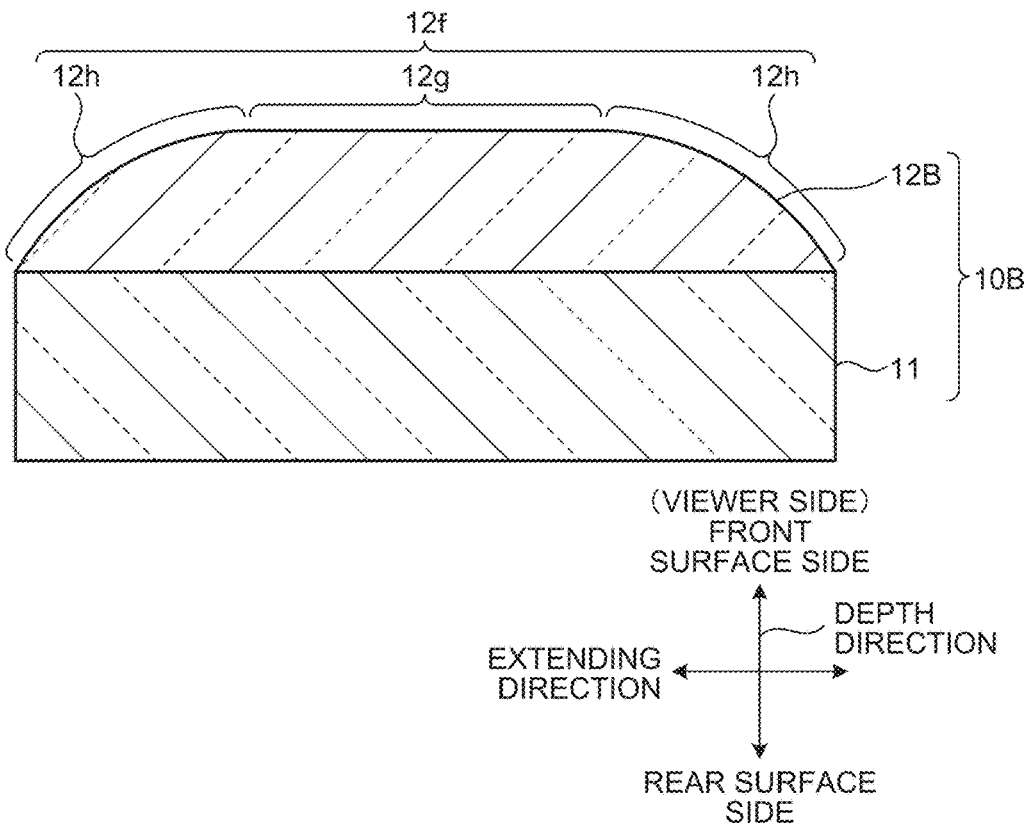
FIG. 15 is a sectional view illustrating a configuration example of the unit pattern according to the second modification of the embodiment.
Figure 16:
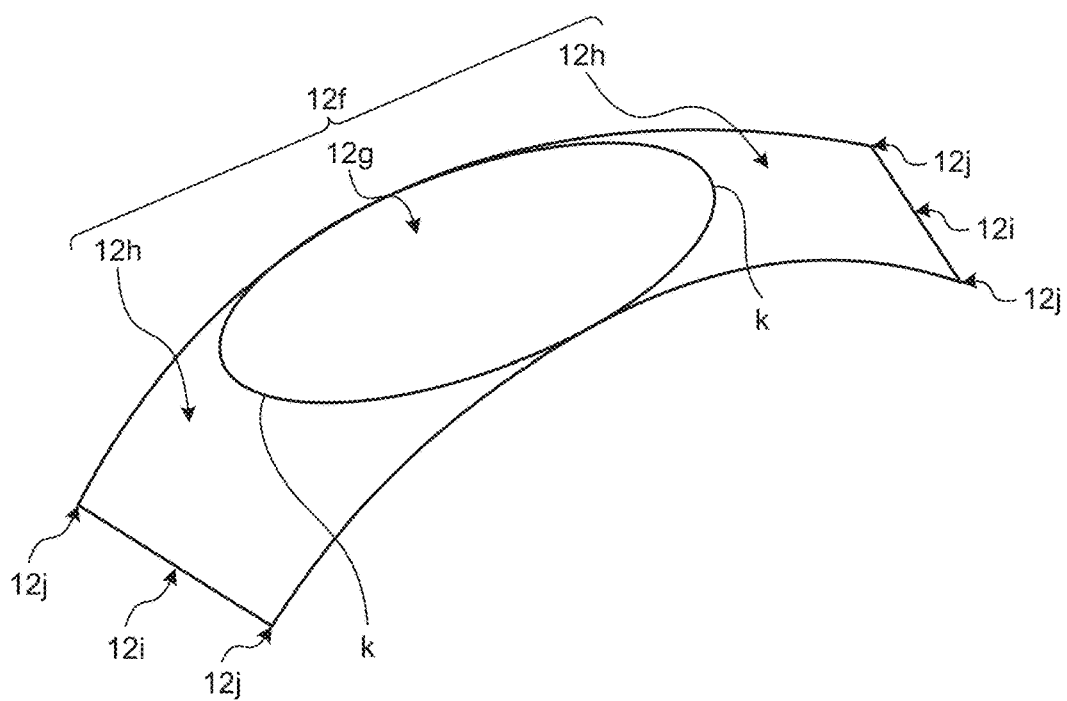
FIG. 16 is a perspective view illustrating a configuration example of the unit pattern according to the second modification of the embodiment.

FIG. 14 is a sectional view illustrating a configuration example of a dial plate 100B according to a second modification of the embodiment. FIG. 15 is a sectional view illustrating a configuration example of a unit pattern 12f according to the second modification of the embodiment. FIG. 16 is a perspective view illustrating a configuration example of the unit pattern 12f according to the second modification of the embodiment. As illustrated in FIG. 14 to FIG. 16, a carbon decorative panel 1B according to the second modification differs from the carbon decorative panel 1 according to the embodiment in that the carbon-toned irregular surface 12a of the clear layer 12B is formed to be convex toward the viewer side. In the carbon decorative panel 1B according to the second modification, the components equivalent to those in the carbon decorative panel 1 according to the embodiment are denoted by the same reference signs and a detailed description thereof is omitted.

The carbon decorative panel 1B includes a substrate 11, a colored layer 19 laminated on the rear surface side of the substrate 11 and colored in a carbon color, and a convex clear layer 12B laminated on the front surface side of the substrate 11.

The clear layer 12B has a carbon-toned pattern M. The clear layer 12B is provided by imprinting on the front surface side of the substrate 11. The clear layer 12B is formed of, for example, a photocurable resin material (ink) that transmits light of wavelengths in the visible light range and is cured when irradiated with UV light. The clear layer 12B includes a carbon-toned irregular surface 12a. The carbon-toned irregular surface 12a is provided on the viewer side of the clear layer 12B and has the carbon-toned pattern M formed with a plurality of projections and depressions. The projections and protrusions constitute a plurality of unit patterns 12f. Each unit pattern 12f constitutes a weave of pseudo carbon fiber bundles presenting actual pre-impregnated carbon fiber bundles in a pseudo manner, and each individual pseudo carbon fiber presenting an actual carbon fiber in a pseudo manner is formed. The unit pattern 12f has a top portion 12g and a pair of curved portions 12h. As illustrated in FIG. 15 and FIG. 16, the unit pattern 12f has the top portion 12g formed to be convex from the opposite side to the viewer side toward the viewer side.

The top portion 12g is formed in an ellipse shape (for example, oval shape) when viewed from the viewer side, and formed to be flat. The top portion 12g is formed, for example, such that the boundary line k of the top portion 12g and a pair of curved portions 12h is formed with an arc-shaped curve protruding from the top portion 12g side toward the curved portion 12h side. The top portion 12g is positioned at the center of the unit pattern 12f in the extending direction of the pseudo carbon fiber bundle, that is, in the long side direction of the unit pattern 12f. The top portion 12g is positioned at the center of the unit pattern 12f in the short side direction orthogonal to the long side direction of the unit pattern 12f. The top portion 12g is formed, for example, over the entire width of the unit pattern 12f in the short side direction.

A pair of curved portions 12h are positioned on both sides of the top portion 12g in the extending direction of the pseudo carbon fiber bundle. The section of a pair of curved portions 12h along the extending direction of a pair of curved portions 12h (that is, the extending direction of the pseudo carbon fiber bundle) is formed in a curved shape (for example, arc shape) protruding from the rear surface side toward the viewer side. The curvature of a pair of curved portions 12h in the section along the extending direction of a pair of curved portions 12h is greater on the center portion 12i side than on the end portion 12j side in the crossing direction that crosses the extending direction. For example, the curvature of a pair of curved portions 12h is largest at the center portion 12i, smaller as the distance from the center portion 12i increases along the crossing direction, and smallest at both end portions 12j, in the crossing direction. With this configuration, the top portion 12g of the unit pattern 12f can be formed in an ellipse shape (for example, oval shape) and the top portion 12g can be formed to be flat.

A clear decoration 10B reflects part of incident light L1 incident on the carbon-toned irregular surface 12a toward the viewer side and transmits the other part of incident light L1 incident on the carbon-toned irregular surface 12a toward the colored layer 19 side.

The carbon-toned irregular surface 12a includes at least two kinds of unit patterns 12f with different inclinations of the top portions 12g. The carbon-toned irregular surface 12a may include, for example, seven kinds of unit patterns 12f with different top portion inclinations D of the top portions 12g. In this case, the top portion inclination D of the top portion 12g varies stepwise in the unit patterns 12f that are adjacent to each other and in which the extending direction of the pseudo carbon fiber bundle is the same direction.

As described above, the carbon decorative panel 1B according to the modification of the embodiment includes the colored layer 19 laminated on the opposite side to the viewer side of the body 10a and colored in the carbon color. The carbon-toned irregular surface 12a is provided on the viewer side of the body 10a, and the top portions 12g of the unit patterns 12f are formed to be convex from the opposite side to the viewer side toward the viewer side. The clear decoration 10B reflects part of light incident on the carbon-toned irregular surface 12a toward the viewer side and transmits the other part of light incident on the carbon-toned irregular surface 12a toward the colored layer 19 side. The carbon-toned irregular surface 12a has the unit patterns 12f that constitute a weave of pseudo carbon fiber bundles presenting carbon fiber bundles in a pseudo manner. The unit patterns 12f each have the top portion 12g positioned at the center in the extending direction of the pseudo carbon fiber bundle. The unit patterns 12f include at least two kinds of unit, patterns 12f with different top portion inclinations D, where the top portion inclination D is the inclination of the long axis P1 along the long side direction of the top portion 12g relative to the reference line Q along the extending direction.

With this configuration, in the carbon decorative panel 1B, the top portion inclinations D of the top portions 12g can be formed in various patterns to achieve the resemblance to the pattern of the protrusion and depression shape of an actual carbon member. In the carbon decorative panel 1B, therefore, the unit patterns 12f having irregularity that appears as if actual pre-impregnated carbon fiber bundles are woven and pressed can be formed. The carbon decorative panel 1B therefore can achieve change of highlights like an actual carbon member and achieve the appearance that resembles an actual carbon member. The carbon decorative panel 1B therefore can appropriately ensure the texture of the carbon-toned pattern M.

Figure 17:
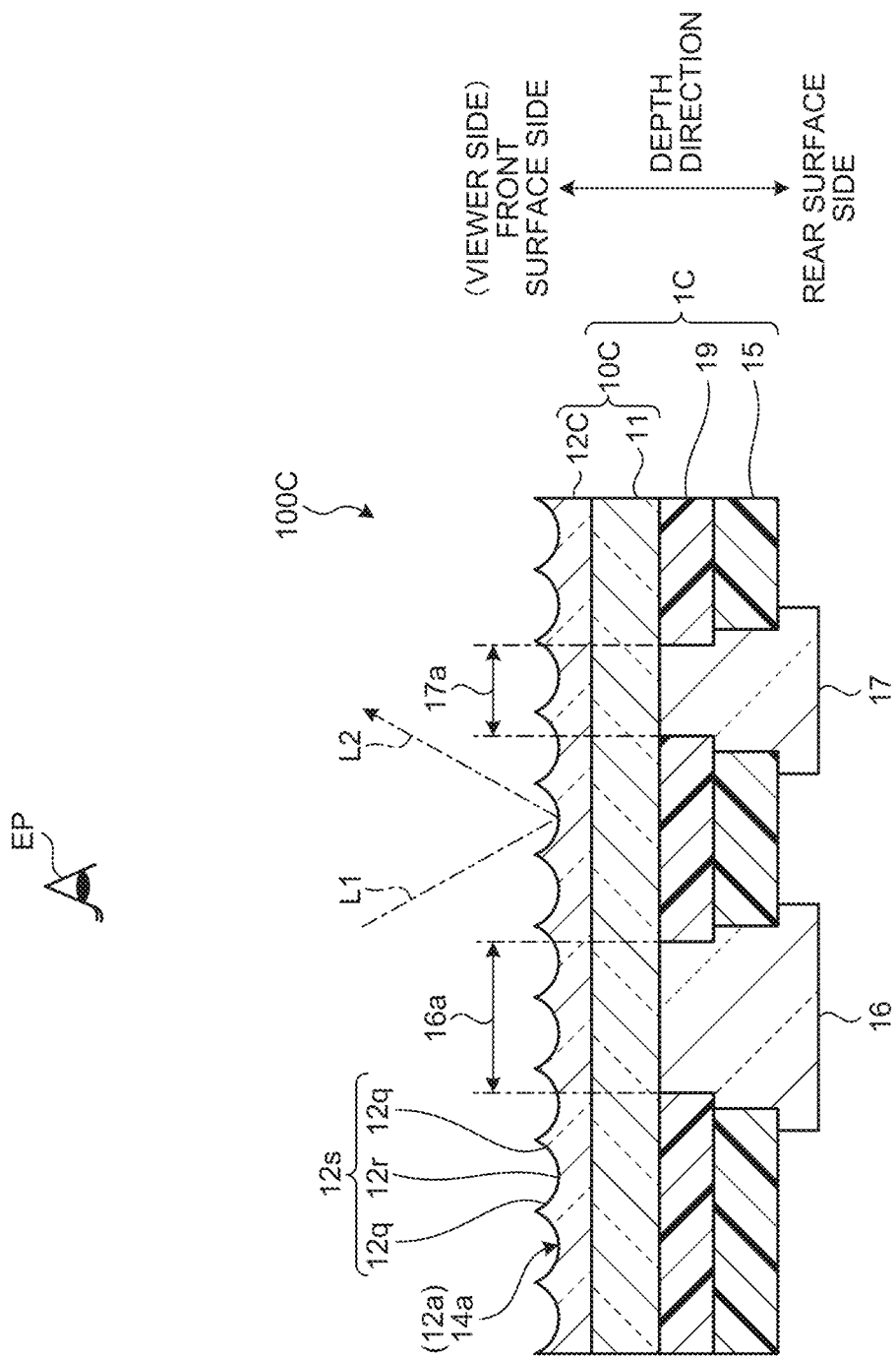
FIG. 17 is a sectional view illustrating a configuration example of the dial plate according to a third modification of the embodiment.
Figure 18:
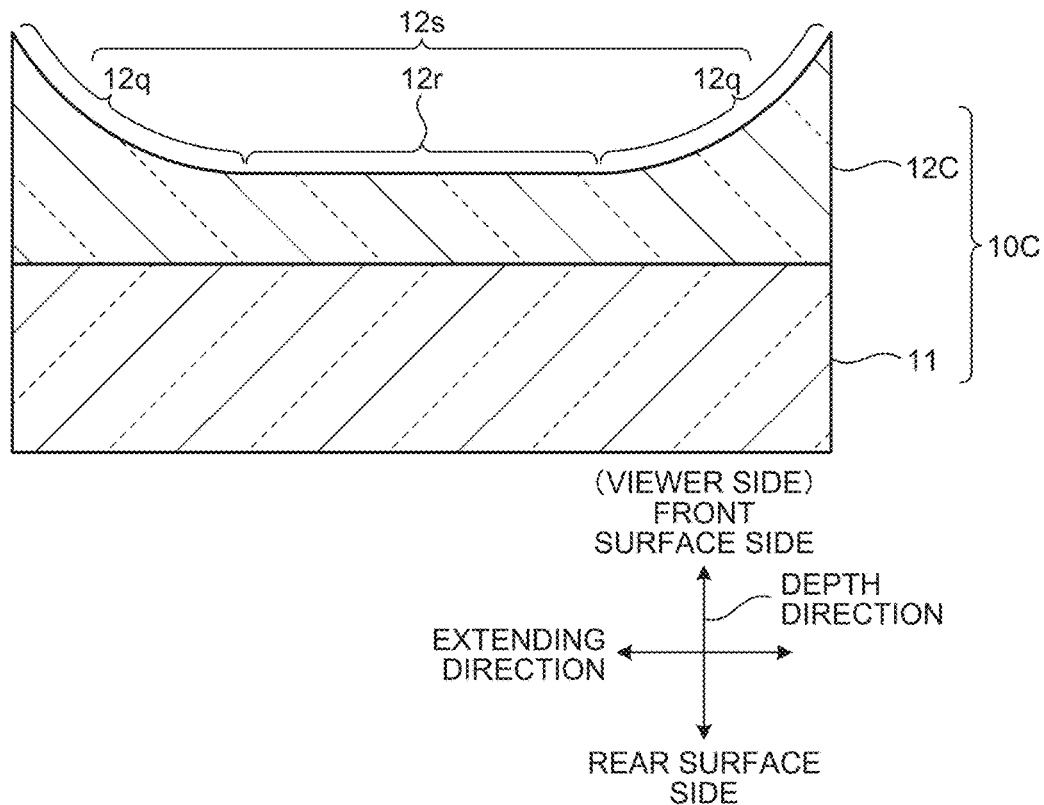
FIG. 18 is a sectional view illustrating a configuration example of the unit pattern according to the third modification of the embodiment.
Figure 19:
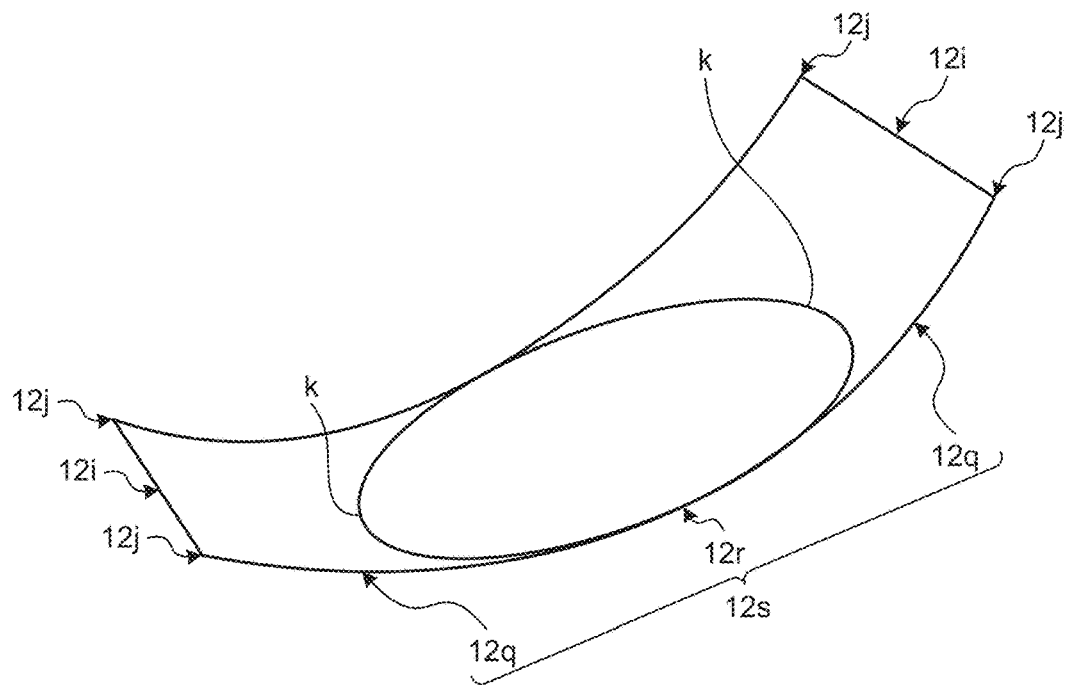
FIG. 19 is a perspective view illustrating a configuration example of the unit pattern according to the third modification of the embodiment.

FIG. 17 is a sectional view illustrating a configuration example of a dial plate 100c according to a third modification of the embodiment. FIG. 18 is a sectional view illustrating a configuration example of a unit pattern 12s according to the third modification of the embodiment. FIG. 19 is a perspective view illustrating a configuration example of the unit pattern 12s according to the third modification of the embodiment. As illustrated in FIG. 17, a carbon decorative panel 1C according to the third modification differs from the carbon decorative panel 1B according to the second modification in that the carbon-toned irregular surface 12a of the clear layer 12C is formed to be concave toward the viewer side. In the carbon decorative panel 1C according to the third modification, the components equivalent to those in the carbon decorative panel 1B according to the second modification are denoted by the same reference signs and a detailed description thereof is omitted.

The carbon decorative panel 1C includes a substrate 11, a colored layer 19 laminated on the rear surface side of the substrate 11 and colored in a carbon color, and a concave clear layer 12C laminated on the front surface side of the substrate 11.

The clear layer 12C has a carbon-toned pattern M formed with a plurality of projections and depressions. The projections and protrusions constitute a plurality of unit patterns 12s. Each unit pattern 12s constitutes a weave of pseudo carbon fiber bundles presenting actual pre-impregnated carbon fiber bundles in a pseudo manner, and each individual pseudo carbon fiber presenting an actual carbon fiber in a pseudo manner is formed. The unit pattern 12s has a top portion 12r and a pair of curved portions 12q. As illustrated in FIG. 18 and FIG. 19, the unit pattern 12s is formed to be concave as viewed from the viewer side.

The top portion 12r is formed in an ellipse shape (for example, oval shape) when viewed from the viewer side, and formed to be flat. The top portion 12r is formed, for example, such that the boundary line k of the top portion 12r and a pair of curved portions 12q is formed with an arc-shaped curve protruding from the top portion 12r side toward the curved portion 12q side. The top portion 12r is positioned at the center of the unit pattern 12s in the extending direction of the pseudo carbon fiber bundle, that is, in the long side direction of the unit pattern 12s. The top portion 12r is positioned at the center of the unit pattern 12s in the short side direction orthogonal to the long side direction of the unit pattern 12s. The top portion 12r is formed, for example, over the entire width of the unit pattern 12s in the short side direction.

A pair of curved portions 12q are positioned on both sides of the top portion 12r in the extending direction of the pseudo carbon fiber bundle. The section of a pair of curved portions 12q along the extending direction of a pair of curved portions 12q (that is, the extending direction of the pseudo carbon fiber bundle) is formed in a curved shape (for example, arc shape) depressed from the viewer side toward the rear surface side. The curvature of a pair of curved portions 12q in the section along the extending direction of a pair of curved portions 12q is greater on the center portion 12i side than on the end portion 12j side in the crossing direction that crosses the extending direction. For example, the curvature of a pair of curved portions 12q is largest at the center portion 12i, smaller as the distance from the center portion 12i increases along the crossing direction, and smallest at both end portions 12j, in the crossing direction. With this configuration, the top portion 12r of the unit pattern 12s can be formed in an ellipse shape (for example, oval shape) and the top portion 12r can be formed to be flat. A clear decoration 10C reflects part of incident light L1 incident on the carbon-toned irregular surface 12a toward the viewer side and transmits the other part of incident light L1 incident on the carbon-toned irregular surface 12a toward the colored layer 19 side.

The carbon-toned irregular surface 12a includes at least two kinds of unit patterns 12s with different inclinations of the top portions 12r. The carbon-toned irregular surface 12a may include, for example, seven kinds of unit patterns 12s with different top portion inclinations D of the top portions 12r. In this case, the top portion inclination D of the top portion 12r varies stepwise in the unit patterns 12s that are adjacent to each other and in which the extending direction of the pseudo carbon fiber bundle is the same direction.

As described above, the carbon decorative panel 1C according to the modification of the embodiment includes the colored layer 19 laminated on the opposite side to the viewer side of the body 10a and colored in the carbon color. The carbon-toned irregular surface 12a is provided on the viewer side of the body 10a, and the top portions 12r of the unit patterns 12s are formed to be concave from the viewer side toward the opposite side to the viewer side. The clear decoration 10C reflects part of light incident on the carbon-toned irregular surface 12a toward the viewer side and transmits the other part of light incident on the carbon-toned irregular surface 12a toward the colored layer 19 side. The carbon-toned irregular surface 12a has the unit patterns 12s that constitute a weave of pseudo carbon fiber bundles presenting carbon fiber bundles in a pseudo manner. The unit patterns 12s each have the top portion 12r positioned at the center in the extending direction of the pseudo carbon fiber bundle. The unit patterns 12s include at least two kinds of unit, patterns 12s with different top portion inclinations D, where the top portion inclination D is the inclination of the long axis P1 along the long side direction of the top portion 12r relative to the reference line Q along the extending direction.

With this configuration, in the carbon decorative panel 1C, the top portion inclinations D of the top portions 12r can be formed in various patterns to achieve the resemblance to the pattern of the protrusion and depression shape of an actual carbon member. In the carbon decorative panel 1C, therefore, the unit patterns 12s having irregularity that appears as if actual pre-impregnated carbon fiber bundles are woven and pressed can be formed. The carbon decorative panel 1C therefore can achieve change of highlights like an actual carbon member and achieve the appearance that resembles an actual carbon member. The carbon decorative panel 1C therefore can appropriately ensure the texture of the carbon-toned pattern M.

The pseudo carbon fiber bundle may have a plurality of linear grooves (not illustrated) that constitute pseudo carbon fibers presenting actual carbon fibers in a pseudo manner. In this case, the linear groove extends along the extending direction of the pseudo carbon fiber bundle. The linear groove is formed to be depressed from the reference plane of the carbon-toned irregular surface 12a along the depth direction (deepness direction). As used herein the reference plane is a plane on the rear surface side in the depth direction of the carbon-toned irregular surface 12a, for example, a plane along the top portion 12d of the carbon-toned irregular surface 12a. The depth of the linear groove is the distance between the reference plane and the bottom portion of the linear groove in the depth direction. A plurality of pseudo carbon fiber bundles include a pseudo carbon fiber bundle in which the length in the extending direction of the linear groove and the depth of the linear groove vary in a predetermined range. Here, it is assumed that the pseudo carbon fiber bundle is a carbon fiber bundle formed by bundling 3000 actual carbon fibers (called 3K carbon fiber bundle). In the unit pattern 12c that constitutes a weave of pseudo carbon fiber bundles, the length in the extending direction of the linear groove and the depth of the linear groove vary in a predetermined range. In the case of the above-described 3K pseudo carbon fiber bundle, the unit patterns 12c are formed such that the length in the long side direction is 4 mm and the length in the short side direction is 2 mm. In this case, each linear groove is formed such that the length in the extending direction of the linear groove is in the range of 1 mm to 4 mm and the depth in the depth direction of the linear groove is in the range of 0 μm to 3 μm at random. As used herein "at random" means that the length of the linear groove and the depth of the linear groove are changed arbitrarily in a predetermined range.

The pseudo carbon fiber bundle may have a plurality of linear protrusions (not illustrated) that constitute pseudo carbon fibers presenting actual carbon fibers in a pseudo manner. The linear protrusion extends along the extending direction of the pseudo carbon fiber bundle. The linear protrusion is formed to protrude from the reference plane of the carbon-toned irregular surface 12a along the depth direction (height direction). As used herein the reference plane is a plane on the front surface side in the depth direction of the carbon-toned irregular surface 12a, that is, a plane along the top portion 12g of the carbon-toned irregular surface 12a. The height of the linear protrusion is the distance between the reference plane and the top portion of the linear protrusion in the depth direction. The pseudo carbon fiber bundles include a pseudo carbon fiber bundle in which the length in the extending direction of the linear protrusion and the height of the linear protrusion vary in a predetermined range. In the present embodiment, it is assumed that the pseudo carbon fiber bundle is a carbon fiber bundle formed by bundling 3000 actual carbon fibers (called 3K carbon fiber bundle). In the unit pattern 12f that constitutes a weave of pseudo carbon fiber bundles, the length in the extending direction of the linear protrusion and the height of the linear protrusion vary in a predetermined range. In the case of the above-described 3K pseudo carbon fiber bundle, the unit patterns 12f are formed such that the length in the long side direction is 4 mm and the length in the short side direction is 2 mm. In this case, each linear protrusion is formed such that the length in the extending direction of the linear protrusion is in the range of 1 mm to 4 mm and the height in the depth direction of the linear protrusion is in the range of 0 μm to 3 μm at random. As used herein "at random" means that the length of the linear protrusion and the height of the linear protrusion are changed arbitrarily in a predetermined range.

In the foregoing description, the top portions 12d, 12g, 12r, and 12u are formed to be an ellipse shape (for example, oval shape) when viewed from the viewer side. However, embodiments are not limited to this shape.

In the example described above, the top portions 12d, 12g, 12r, and 12u are formed to be flat. However, embodiments are not limited thereto. For example, they may be formed to be a curved shape having a curvature smaller than that of a pair of curved portions 12e, 12h, 12q, and 12t.

In the example described above, the carbon-toned irregular surface 12a includes seven kinds of unit patterns 121c to 127c with different top portion inclinations D. However, embodiments are not limited thereto. At least two kinds of unit patterns 12c, 12f, 12s, and 12v are included.

In the example described above, the top portion inclination D is an inclination of the long axis P1 relative to the reference line Q. However, embodiments are not limited thereto. The top portion inclination D may be an inclination of the short axis P2 along the short side direction of the top portion 12d relative to the reference line Q. When the top portion 12d is an oval, the long axis P1 corresponds to the longer diameter of the oval and the short axis P2 corresponds to the shorter diameter of the oval.

In the example described above, the carbon decorative panel 1 is applied to the dial plate 100 as a decorative part having the carbon-toned pattern M. However, embodiments are not limited thereto and may be applied to a decorative sheet for an instrument panel.

The dial plates 100 and 100A described above include the carbon decorative panels 1 and 1A, the AG print layer 13, the design layer 16, and the smoke layer 17. However, embodiments are not limited thereto and may have any other configuration.

The body 10a of the clear decorations 10, 10A, 10B, and 10C described above includes the substrate 11 and the clear layers 12, 12A, 12B, and 12C formed as separated components by imprinting. However, embodiments are not limited thereto. The body 10a of the clear decorations 10, 10A, 10B, and 10C may be formed, for example, such that the substrate 11 and the clear layers 12, 12A, 12B, and 12C are integrally formed by resin injection molding.

The clear layers 12, 12A, 12B, and 12C described above are formed on the substrate 11 by UV-curing imprinting. However, embodiments are not limited thereto. For example, thermal-curing imprinting may be used.

The dial plates 100 and 100A described above include the AG print layer 13 as a low reflection layer. However, a member other than the AG print layer 13 may be used to form a low reflection layer.

The AG print layer 13, the carbon color layer 14, the light-blocking print layer 15, the design layer 16, and the smoke layer 17 are formed using a screen printer in the example above. However, embodiments are not limited thereto. For example, they may be formed using an inkjet printer.

The resin decorative part and the dial plate according to the present embodiment includes at least two kinds of unit patterns in which the top portion inclinations of the unit patterns are different from each other. This configuration can achieve the resemblance to the top portions of the projection and depression shape of an actual carbon member and appropriately ensure the texture of the carbon-toned decoration.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A resin decorative part comprising:
a clear decoration having a transparent body transmitting light, the transparent body including a carbon-toned irregular surface having a carbon-toned pattern formed with protrusions and depressions, wherein
the carbon-toned irregular surface has a plurality of unit patterns that are transparent and constitute a transparent and simulated weave of pseudo carbon fiber bundles representing carbon fiber bundles in a pseudo manner, as the protrusions and depressions that form the carbon-toned pattern,
the unit patterns each have a top portion which is formed in an ellipse shape when viewed from the viewer side of the transparent body and positioned at a center in an extending direction of the pseudo carbon fiber bundle and include at least two unit patterns with different top portion inclinations in the plurality of the unit patterns in which the extending direction of the pseudo carbon fiber bundle is the same direction, where the top portion inclination is an inclination of a center line along a long side direction of the top portion relative to a reference line along the extending direction.

2. The resin decorative part according to claim 1, wherein the top portion inclination of the top portion varies stepwise in the unit patterns that are adjacent to each other.

3. The resin decorative part according to claim 1, wherein the carbon-toned pattern is a twill weave pattern in which the extending direction of the pseudo carbon fiber bundle coincides with a long side direction of the unit pattern and the long side direction crosses one another.

4. The resin decorative part according to claim 2, wherein the carbon-toned pattern is a twill weave pattern in which the extending direction of the pseudo carbon fiber bundle coincides with a long side direction of the unit pattern and the long side direction crosses one another.

5. The resin decorative part according to claim 1, wherein
the unit patterns each have a pair of curved portions positioned on both sides of the top portion in the extending direction and formed in a curved shape, and
a curvature of the pair of curved portions in a section along the extending direction of the pair of curved portions is greater on a center portion side than on an end portion side in a crossing direction that crosses the extending direction.

6. The resin decorative part according to claim 2, wherein
the unit patterns each have a pair of curved portions positioned on both sides of the top portion in the extending direction and formed in a curved shape, and
a curvature of the pair of curved portions in a section along the extending direction of the pair of curved portions is greater on a center portion side than on an end portion side in a crossing direction that crosses the extending direction.

7. The resin decorative part according to claim 3, wherein
the unit patterns each have a pair of curved portions positioned on both sides of the top portion in the extending direction and formed in a curved shape, and
a curvature of the pair of curved portions in a section along the extending direction of the pair of curved portions is greater on a center portion side than on an end portion side in a crossing direction that crosses the extending direction.

8. The resin decorative part according to claim 5, wherein a boundary line of the top portion and the pair of curved portions is an arc-shaped curve protruding from the top portion side toward the curved portion side.

9. The resin decorative part according to claim 1, further comprising:
a carbon color layer colored in a carbon color and reflecting light, wherein
the carbon-toned irregular surface is disposed on an opposite side to a viewer side of the body, and the top portions of the unit patterns are formed to be concave from the opposite side to the viewer side toward the viewer side, and
the carbon color layer is laminated on the carbon-toned irregular surface and includes a reflective surface in contact with the unit patterns to reflect light transmitted through the clear decoration.

10. The resin decorative part according to claim 2, further comprising:
a carbon color layer colored in a carbon color and reflecting light, wherein
the carbon-toned irregular surface is disposed on an opposite side to a viewer side of the body, and the top portions of the unit patterns are formed to be concave from the opposite side to the viewer side toward the viewer side, and
the carbon color layer is laminated on the carbon-toned irregular surface and includes a reflective surface in contact with the unit patterns to reflect light transmitted through the clear decoration.

11. The resin decorative part according to claim 3, further comprising:
a carbon color layer colored in a carbon color and reflecting light, wherein
the carbon-toned irregular surface is disposed on an opposite side to a viewer side of the body, and the top portions of the unit patterns are formed to be concave from the opposite side to the viewer side toward the viewer side, and
the carbon color layer is laminated on the carbon-toned irregular surface and includes a reflective surface in contact with the unit patterns to reflect light transmitted through the clear decoration.

12. The resin decorative part according to claim 5, further comprising:
a carbon color layer colored in a carbon color and reflecting light, wherein
the carbon-toned irregular surface is disposed on an opposite side to a viewer side of the body, and the top portions of the unit patterns are formed to be concave from the opposite side to the viewer side toward the viewer side, and
the carbon color layer is laminated on the carbon-toned irregular surface and includes a reflective surface in contact with the unit patterns to reflect light transmitted through the clear decoration.

13. The resin decorative part according to claim 8, further comprising:
a carbon color layer colored in a carbon color and reflecting light, wherein
the carbon-toned irregular surface is disposed on an opposite side to a viewer side of the body, and the top portions of the unit patterns are formed to be concave from the opposite side to the viewer side toward the viewer side, and
the carbon color layer is laminated on the carbon-toned irregular surface and includes a reflective surface in contact with the unit patterns to reflect light transmitted through the clear decoration.

14. The resin decorative part according to claim 1, further comprising:
a colored layer laminated on an opposite side to a viewer side of the body and colored in a carbon color, wherein
the carbon-toned irregular surface is disposed on the viewer side of the body, and the top portions of the unit patterns are formed to be convex from the opposite side to the viewer side toward the viewer side, and
the clear decoration reflects part of light incident on the carbon-toned irregular surface toward the viewer side and transmit another part of light incident on the carbon-toned irregular surface toward the side of the body that colored layer is laminated on.

15. The resin decorative part according to claim 2 further comprising:
a colored layer laminated on an opposite side to a viewer side of the body and colored in a carbon color, wherein
the carbon-toned irregular surface is disposed on the viewer side of the body, and the top portions of the unit patterns are formed to be convex from the opposite side to the viewer side toward the viewer side, and
the clear decoration reflects part of light incident on the carbon-toned irregular surface toward the viewer side and transmit another part of light incident on the carbon-toned irregular surface toward the side of the body that the colored layer is laminated on.

16. The resin decorative part according to claim 3 further comprising:

a colored layer laminated on an opposite side to a viewer side of the body and colored in a carbon color, wherein the carbon-toned irregular surface is disposed on the viewer side of the body, and the top portions of the unit patterns are formed to be convex from the opposite side to the viewer side toward the viewer side, and the clear decoration reflects part of light incident on the carbon-toned irregular surface toward the viewer side and transmit another part of light incident on the carbon-toned irregular surface toward the side of the body that the colored layer is laminated on.

17. The resin decorative part according to claim 5 further comprising:

a colored layer laminated on an opposite side to a viewer side of the body and colored in a carbon color, wherein the carbon-toned irregular surface is disposed on the viewer side of the body, and the top portions of the unit patterns are formed to be convex from the opposite side to the viewer side toward the viewer side, and the clear decoration reflects part of light incident on the carbon-toned irregular surface toward the viewer side and transmit another part of light incident on the carbon-toned irregular surface toward the side of the body that the colored layer is laminated on.

18. The resin decorative part according to claim 8 further comprising:

a colored layer laminated on an opposite side to a viewer side of the body and colored in a carbon color, wherein the carbon-toned irregular surface is disposed on the viewer side of the body, and the top portions of the unit patterns are formed to be convex from the opposite side to the viewer side toward the viewer side, and the clear decoration reflects part of light incident on the carbon-toned irregular surface toward the viewer side and transmit another part of light incident on the carbon-toned irregular surface toward the side of the body that the colored layer is laminated on.

19. A dial plate comprising:

a clear decoration having a transparent body disposed in a vehicle and transmitting light, the transparent body including a carbon-toned irregular surface having a carbon-toned pattern formed with protrusions and depressions;

a low reflection layer laminated on a viewer side of the body and suppressing reflection of light; and a design display section disposed on the body and transmitting light such that a design related to the vehicle is illuminated, wherein the carbon-toned irregular surface has a plurality of unit patterns that are transparent and constitute a transparent and simulated weave of pseudo carbon fiber bundles representing carbon fiber bundles in a pseudo manner, as the protrusions and depressions that form the carbon-toned pattern, and the unit patterns each have a top portion which is formed in an ellipse shape when viewed from the viewer side of the transparent body and positioned at a center in an extending direction of the pseudo carbon fiber bundle and include at least two unit patterns with different top portion inclinations in the plurality of the unit patterns in which the extending direction of the pseudo carbon fiber bundle is the same direction, where the top portion inclination is an inclination of a center line along a long side direction of the top portion relative to a reference line along the extending direction.

\* \* \* \* \*